(12) United States Patent
Van Bommel et al.

(10) Patent No.: US 11,933,490 B2
(45) Date of Patent: Mar. 19, 2024

(54) LASER PHOSPHOR BASED LIGHT SOURCE WITH IMPROVED BRIGHTNESS

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 51 days.

(21) Appl. No.: 17/626,143

(22) PCT Filed: Jul. 14, 2020

(86) PCT No.: PCT/EP2020/069857
§ 371 (c)(1),
(2) Date: Jan. 11, 2022

(87) PCT Pub. No.: WO2021/009160
PCT Pub. Date: Jan. 21, 2021

(65) Prior Publication Data
US 2022/0275925 A1    Sep. 1, 2022

(30) Foreign Application Priority Data
Jul. 15, 2019   (EP) .................................... 19186315

(51) Int. Cl.
*F21V 9/30*   (2018.01)
*F21V 5/04*   (2006.01)
(Continued)

(52) U.S. Cl.
CPC ................ *F21V 9/30* (2018.02); *F21V 5/04* (2013.01); *F21V 9/20* (2018.02); *F21V 23/003* (2013.01);
(Continued)

(58) Field of Classification Search
CPC ..... F21V 9/30; F21V 9/20; F21V 5/04; F21V 23/003; G02B 21/204; G02B 21/2053; H05B 45/22
See application file for complete search history.

(56) References Cited

U.S. PATENT DOCUMENTS

| 8,384,294 B2* | 2/2013 | Hatley .................. H05B 45/20 315/149 |
| 2009/0078949 A1* | 3/2009 | Bechtel .................... F21K 9/64 257/E33.061 |

(Continued)

FOREIGN PATENT DOCUMENTS

| WO | 2006054203 A1 | 5/2006 |
| WO | 2018150032 A1 | 8/2018 |

*Primary Examiner* — Tracie Y Green
*Assistant Examiner* — Michael Chiang

(57) ABSTRACT

The invention provides a lighting system (1000) configured to generate lighting system light (1001), wherein the lighting system light (1001) comprises one or more of (i) a first lighting system light component (1101) having a first component optical power Wopt,comp1, and (ii) a second lighting system light component (1201) having a second component optical power Wopt,comp2; wherein the lighting system (1000) comprises: —a first light source (110) comprising a first pump light source (10) configured to generate first pump light source light (11) and a luminescent material (200) configured to convert at least part of the first pump light source light (11) into luminescent material light (201), wherein the first light source (110) optionally in combination with first optics (115) is configured to provide the first lighting system light component (1101), wherein the first lighting system light component (1101) comprises at least part of the luminescent material light (201), wherein the first lighting system light component (1101) has a first spectral power distribution with spectral intensity at a first wavelength $\lambda 1$; —a second light source (120) comprising a laser (Continued)

light source (20) configured to generate laser light source light (21), wherein the second light source (120) optionally in combination with second optics (125) is configured to provide the second lighting system light component (1201), wherein the second lighting system light component (1201) comprises at least part of the laser light source light (21), wherein the second lighting system light component (1201) has a second spectral power distribution, different from the first spectral power distribution, with spectral intensity at a second wavelength $\lambda 2$, wherein the second wavelength $\lambda 2$ is selected from the range of $\lambda 1-30$ nm$\leq \lambda 2 \leq \lambda 1+30$ nm; —a control system (30) configured to control in one or more control modes the second component optical power Wopt, comp2 of the second lighting system light component (1201) in dependence of the first component optical power Wopt, comp1 of the first lighting system light component (1101).

15 Claims, 8 Drawing Sheets

(51) Int. Cl.
| | | |
|---|---|---|
| *F21V 9/20* | (2018.01) | |
| *F21V 23/00* | (2015.01) | |
| *G03B 21/20* | (2006.01) | |
| *F21Y 113/10* | (2016.01) | |
| *F21Y 115/30* | (2016.01) | |

(52) U.S. Cl.
CPC ....... *G03B 21/204* (2013.01); *G03B 21/2053* (2013.01); *F21Y 2113/10* (2016.08); *F21Y 2115/30* (2016.08)

(56) References Cited

U.S. PATENT DOCUMENTS

| | | | |
|---|---|---|---|
| 2010/0158061 A1* | 6/2010 | Schulz | G01J 3/10 315/149 |
| 2015/0167907 A1* | 6/2015 | Hoehmann | F21V 3/08 362/84 |
| 2017/0356613 A1* | 12/2017 | Van Bommel | F21V 23/0457 |
| 2018/0080630 A1* | 3/2018 | Wang | G03B 21/2013 |
| 2020/0218142 A1* | 7/2020 | Vetsuypens | G03B 21/2013 |

* cited by examiner

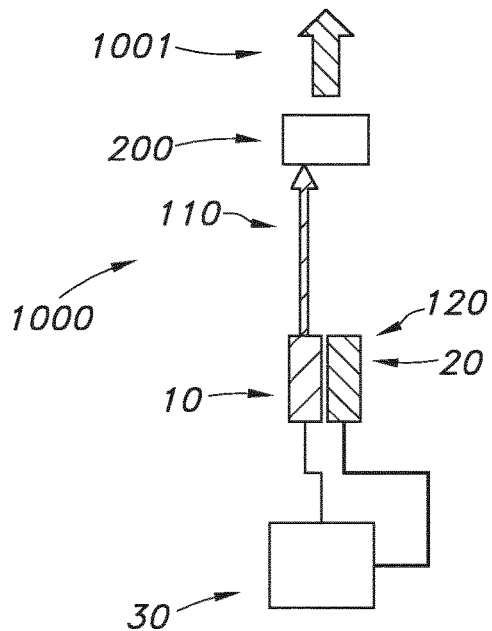
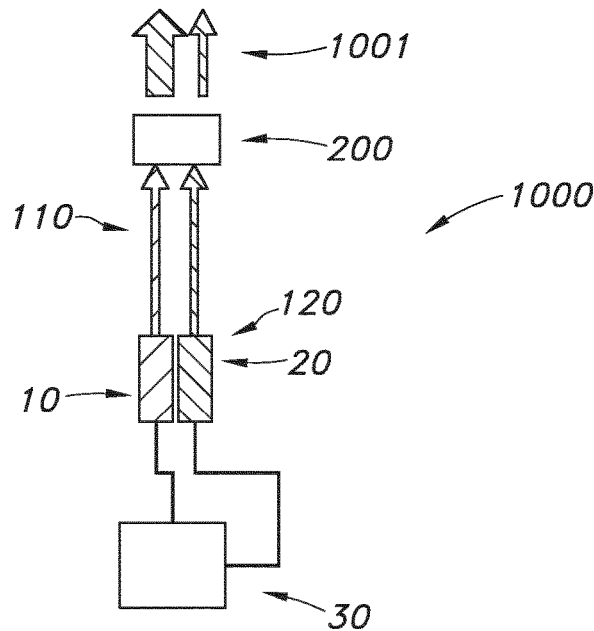
FIG. 5A    FIG. 5B
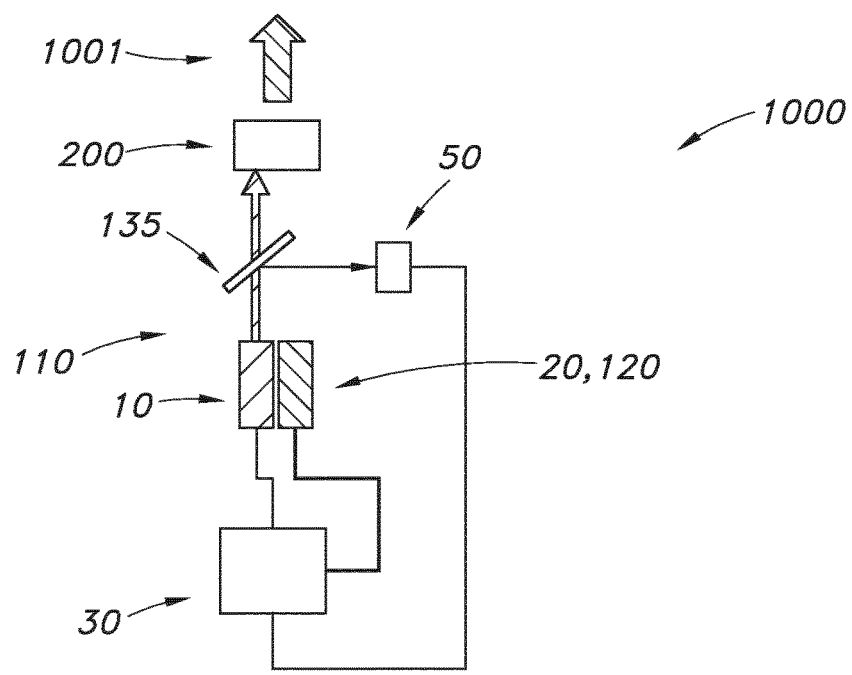
FIG. 6

LASER PHOSPHOR BASED LIGHT SOURCE WITH IMPROVED BRIGHTNESS

CROSS-REFERENCE TO PRIOR APPLICATIONS

This application is the U.S. National Phase application under 35 U.S.C. § 371 of International Application No. PCT/EP2020/069857, filed on Jul. 14, 2020, which claims the benefit of European Patent Application No. 19186315.8, filed on Jul. 15, 2019. These applications are hereby incorporated by reference herein.

FIELD OF THE INVENTION

The invention relates to a lighting system. The invention also relates to a projection system or a luminaire comprising such system.

BACKGROUND OF THE INVENTION

Laser based lighting systems are known in the art. US2017/0356613, for instance, describes a laser lighting system having a first laser light source, a second laser light source and a light conversion element. The outputs from the first and second laser light sources are directed to the light conversion element, which generates wavelength-converted light output in response to excitation by laser light. The first and second laser light sources generate laser light of different wavelength having different absorption characteristics within the light conversion element, such that the range of depths within the light conversion element from which wavelength-converted light is generated is different. This difference in converted output can be used to create different optical effects so that beam steering or beam shaping can be performed.

US2018/080630A discloses a light emitting device that includes a first light source module comprising a light source for emitting exciting light, a second light source for emitting second light and a color wheel. The color wheel emits the second light and first light that comprises at least one beam of excited light under irradiation of the light source and the second light source. The second light spectrally overlaps the at least one beam of excited light in the first light, and the second light and the excited light spectrally overlapping the second light are simultaneously emitted.

US2015/167907A discloses a lighting device comprising a phosphor, a first laser for irradiating the phosphor with a first laser radiation to generate colored light having a first light color. A second laser configured for emitting a second laser radiation having a second light color, wherein the second light color of the second laser radiation is identical in color to the first light color. The lighting device is configured to simultaneously emit the second laser radiation and the wavelength-converted colored light of identical color emitted by the phosphor.

SUMMARY OF THE INVENTION

Phosphors can be used for conversion of (laser) light for light generation. For instance, a blue (laser) light source may be used to generate white light with a luminescent material that partially converts the blue (laser) light into e.g. yellow light. The luminous flux from the phosphor material may increases linearly with the input power until saturation effects (thermally and/or optically induced) start to limit the conversion. The temperature of the phosphor and/or the intensity of light may influence the saturation power level and the conversion efficiency. Hence, though a linear behavior is desired, a non-linear behavior of the spectral power may be perceived.

Hence, it is an aspect of the invention to provide an alternative lighting system ("system"), which preferably further at least partly obviates one or more of above-described drawbacks. The present invention may have as object to overcome or ameliorate at least one of the disadvantages of the prior art, or to provide a useful alternative.

In an aspect, the invention provides a lighting system configured to generate lighting system light. Especially, such system may include a main light source that is luminescent material light conversion based and an assistant light source, that may be used to compensate for possible non-linearities of the main light source. In embodiments, the lighting system light may comprise one or more of (i) a first lighting system light component ("first light component" or "first component") having a first component optical power $W_{opt,comp1}$, and (ii) a second lighting system light component (second light component" or "second component") having a second component optical power $W_{opt,comp2}$. Especially, the lighting system light has an optical power $W_{opt,sys}$ an optical power $W_{opt,sys}$. In embodiments, optical power $W_{opt,sys}$ of the lighting system light is controllable. Further, in specific embodiments the lighting system comprises a first light source and a second light source, and especially in further embodiments also comprises a control system or is functionally coupled to such control system. In specific embodiments, the first light source comprises a first pump light source configured to generate first pump light source light. The lighting system may further comprise a luminescent material configured to convert at least part of the first pump light source light into luminescent material light. In specific embodiments, the first light source, optionally in combination with first optics, may be configured to provide the first lighting system light component. Especially, the first lighting system light component may comprise at least part of the luminescent material light. Further, especially the first lighting system light component has a first spectral power distribution with spectral intensity at a first wavelength $\lambda_1$. In embodiments, a first optical power of the first pump light source light is controllable; thereby, the first component optical power $W_{opt,comp1}$ of the first lighting system light component may be controllable. Yet further, the second light source may comprise a laser light source ("second light source") configured to generate laser light source light. Especially, in embodiments the second light source, optionally in combination with second optics, may be configured to provide the second lighting system light component. Especially, the second lighting system light component may comprise at least part of the laser light source light. Yet further, in embodiments the second lighting system light component may have a second spectral power distribution, different from the first spectral power distribution, with spectral intensity at a second wavelength $\lambda_2$. Especially, in embodiments the second wavelength $\lambda_2$ may be selected from the range of $\lambda_1-z1$ nm$\leq\lambda_2\leq\lambda_1+z1$ nm, wherein z1 may in embodiments be 30. In specific embodiments, a second optical power of the laser light source light may be controllable; thereby, the second component optical power $W_{opt,comp2}$ of the second lighting system light component may be controllable. As indicated above, the lighting system may further comprise or be functionally coupled to a control system, which may especially be configured to control in one or more control modes (of the control system) the second component optical power $W_{opt,comp2}$ of the second lighting system light component in dependence of the first component optical power $W_{opt,comp1}$ of the first lighting system light component. Hence, especially the invention provides a lighting system configured to generate lighting system light, wherein the lighting system light comprises one or more of (i) a first lighting system light component having a first component optical power $W_{opt,comp1}$, and (ii) a second lighting system light component having a second component optical power $W_{opt,comp2}$, wherein the lighting system comprises in embodiments (a) a first light source comprising a first pump light source configured to generate first pump light source light and a luminescent material configured to convert at least part of the first pump light source light into luminescent material light, wherein the first light source optionally in combination with first optics is configured to provide the first lighting system light component, wherein the first lighting system light component comprises at least part of the luminescent material light, wherein the first lighting system light component has a first spectral power distribution with spectral intensity at a first wavelength $\lambda_1$; (b) a second light source comprising a laser light source configured to generate laser light source light, wherein the second light source optionally in combination with second optics is configured to provide the second lighting system light component, wherein the second lighting system light component comprises at least part of the laser light source light, wherein the second lighting system light component has a second spectral power distribution, different from the first spectral power distribution, with spectral intensity at a second wavelength $\lambda_2$, wherein the second wavelength $\lambda_2$ is selected from the range of $\lambda_1-30$ nm$\leq\lambda_2\leq\lambda_1+30$ nm; and (c) a control system configured to control in one or more control modes the second component optical power $W_{opt,comp2}$ of the second lighting system light component in dependence of the first component optical power $W_{opt,comp1}$ of the first lighting system light component, wherein the control system is further configured to control in a first control mode the second component optical power $W_{opt,comp2}$ of the second lighting system light component in dependence of the first component optical power $W_{opt,comp1}$ of the first lighting system light component only above a predetermined threshold value of the first component optical power $W_{opt,comp1}$ of the first lighting system light component.

With such system it is possible to have a larger range of dimming with linear optical output. With such system, it may also be possible to have a relatively high color rendering index (CRI) by using a luminescent material (sometimes also indicated as "phosphor") and reduce the impact of quenching with the second light source, while substantially maintaining the color point and CRI. Hence, in specific embodiments white light may be generated on the basis of at least a luminescent material with a lighting system that may have an increased linear dimming range.

As indicated above, the lighting system is configured to generate lighting system light. The term "lighting system light" may especially refer to the light that emanates from the lighting system, such as emanating from a light exit window (or "end window"), during operation of the lighting system. The lighting system comprises a first light source, a second light source, and a luminescent material. The luminescent material may be comprised by the first light source.

During operation of the lighting system, the lighting system light comprises one or more of (i) a first lighting system light component having a first component optical power $W_{opt,comp1}$, and (ii) a second lighting system light component having a second component optical power $W_{opt,comp2}$. Optionally, also further lighting system light components may be available (see also below). Here, the phrase "the lighting system light comprises one or more of (i) a first lighting system light component having a first component optical power $W_{opt,comp1}$, and (ii) a second lighting system light component having a second component optical power $W_{opt,comp2}$" and similar phrases especially referred to the herein indicated controlling modes.

As indicated above, it is not excluded that also other controlling modes are available, wherein the lighting system is configured to generate lighting system light having only one or more further lighting system light components (not being the first lighting system light component and the second lighting system light component).

The phrase "the lighting system light comprises one or more of (i) a first lighting system light component having a first component optical power $W_{opt,comp1}$, and (ii) a second lighting system light component having a second component optical power $W_{opt,comp2}$" and similar phrases especially indicate that in the herein indicated controlling modes the lighting system light either comprises the first lighting system light component or the second lighting system light component or both. The ratio of these components may e.g. depend upon the controlling mode.

In embodiments, the first light source may comprise a first pump light source configured to generate first pump light source light. Especially, the first light source may comprise a solid state laser pump light source, though other options may also be possible (see further also below). The term "pump light source" may also refer to a plurality of (different) pump light sources.

The lighting system, especially the first light source, may further comprise a luminescent material. The term "luminescent material" may also refer to a plurality of (different) luminescent materials. The luminescent material is configured to convert at least part of the first pump light source light into luminescent material light. In embodiments, the luminescent material may be configured to absorb at least 80%, such as at least 90%, like at least 95%, such as even at least 99%, of all pump light source light. A substantial part thereof, like at least 70%, such as at least 80%, like in specific embodiments at least 85% may be converted into luminescent material light. A conversion of 85% indicates a quantum efficiency of essentially 85%. The luminescent material may be configured remote from the pump light source. However, the luminescent material may also be in optical contact or even physical contact with the pump light source.

The first light source, optionally in combination with first optics, is especially configured to provide the first lighting system light component. Here, the first optics may especially refer to those optics that may have a wavelength dependent influence on the luminescent material light, like a color filter (see further also below).

The first lighting system light component especially comprises at least part of the luminescent material light. For instance, at least 70%, like at least 80%, like especially at least 90%, such as even more especially at least 95% of the spectral power distribution of the first lighting system light may consist of the luminescent material light. For instance, a blue laser light source may provide blue laser light that is converted by a blue absorbing and green emitting luminescent material, such as e.g. LuAG ($Lu_3Al_5O_{12}$:$Ce^{3+}$). The first light source comprising the blue laser light source as pump light source and the green emitting luminescent material as luminescent material may provide the first lighting system light component which may essentially only consist of the green emission of LuAG.

Especially, the first lighting system light component has a first spectral power distribution with spectral intensity at a first wavelength $\lambda_1$. The phrase "spectral intensity at a first wavelength $\lambda_1$" may also refer to a spectral emission with intensities at different wavelengths, such as e.g. LuAG. The wavelength $\lambda_1$ may e.g. refer to the dominant wavelength or the peak wavelength (see also below).

In specific embodiments, a first optical power of the first pump light source light may be controllable (by the control system). Hence, in embodiments the first component optical power $W_{opt,comp1}$ of the first lighting system light component may be controllable.

The term "first light source" may also refer to a plurality of (different) first light sources. Hence, the term "first light source" may also refer to "at least one first light source".

Especially, in embodiments it is assumed that basically there is a linear relation between the input power ($W_{10}$) of the pump light source and the optical output power ($W_{opt,10}$) of the pump light source light of the pump light source. Hence, especially there may be a (positive) linear relation between dimming of the pump light source and the optical power of the pump light source light. A positive linear relation is of the type y=a*x (or y=a*x+b).

As also indicated above, the lighting system also comprises a second light source. In embodiments, the second light source may comprise a laser light source configured to generate laser light source light. Especially, the laser light source is a solid state laser light source.

The second light source, optionally in combination with second optics, may especially be configured to provide the second lighting system light component. Here, the second optics may especially refer to those optics that may have a wavelength dependent influence on the luminescent material light, like a color filter (see further also below). In general, such second optics, if available at all, may have a small or negligible or essentially zero impact on the laser light source light, as that may be relatively narrow-banded (see also below).

Especially, the second lighting system light component comprises at least part of the laser light source light. For instance, at least 70%, like at least 80%, like especially at least 90%, such as even more especially at least 95%, like at least 99%, of the spectral power distribution of the second lighting system light may consist of the laser light source light.

In specific embodiments, the second light source may not be based on light conversion with a luminescent material.

In embodiments, the second lighting system light component has a second spectral power distribution, different from the first spectral power distribution, with spectral intensity at a second wavelength $\lambda_2$. The phrase "spectral intensity at a second wavelength $\lambda_2$" may also refer to a spectral emission with intensities at different wavelengths. The wavelength $\lambda_2$ may e.g. refer to the dominant wavelength or the peak wavelength (see also below). As the second lighting system light component may essentially consist of laser light source light, the peak wavelength may in embodiments be essentially identical to the dominant wavelength.

In specific embodiments, the second spectral power distribution has a narrow band shape or even line shape. In embodiments, the second spectral power distribution may have a full width half maximum (FWHM) of at maximum 50 nm, such as especially at maximum 40 nm, like in embodiments at maximum 30 nm, like in in embodiments at maximum 20 nm. In general, the FWHM may be equal to or smaller than 30 nm, such as equal to or smaller than 10 nm, such as at maximum 5 nm, like at maximum about 2 nm.

The second spectral power distribution is different from the first spectral power distribution. In embodiments, this may imply that the first spectral power distribution only overlaps with at maximum 20% of the second spectral power distribution, such as at maximum 10%, or the second spectral power distribution only overlaps with at maximum 20% of the first spectral power distribution, such as at maximum 10%. In embodiments, the spectral overlap may be at least 0.1%, like at least 1%, such as at least 2%.

Thought the second spectral power distribution is different from the first spectral power distribution, especially the second wavelength $\lambda_2$ is selected from the range of $\lambda_1-30$ nm $\leq \lambda_2 \leq \lambda_1+30$ nm. For instance, the peak maxima or dominant wavelengths may be relatively be the same, or even be essentially the same. In embodiments, $\lambda_1-20$ nm $\leq \lambda_2 \leq \lambda_1+20$ nm; even more especially $\lambda_1-10$ nm $\leq \lambda_2 \leq \lambda_1+10$ nm. In yet other specific embodiments, $0.92 \leq \lambda_2/\lambda_1 \leq 1.08$, such as $0.94 \leq \lambda_2/\lambda_1 \leq 1.06$, like especially $0.96 \leq \lambda_2/\lambda_1 \leq 1.04$.

Alternatively or additionally, the first lighting system light component and the second lighting system light component may essentially have the same color point. Color points may be the same or essentially identical when differences in x and/or y of the color points (CIE 1931) are equal to or smaller than 0.1, like equal to or smaller than 0.05, even more especially equal to or smaller than 0.02. Especially, the differences in x-values and/or y-values are not larger than 0.05, such as not larger than 0.02. Hence, color points 0.5;0.4 and 0.45;0.35 may still be the considered as the same color point.

As indicated above, the second optical power of the laser light source light may (also) be controllable. In this way, the second component optical power $W_{opt,comp2}$ of the second lighting system light component may (thus) be controllable.

Moreover, as the first component optical power $W_{opt,comp1}$ of the first lighting system light component may be controllable and the second optical power of the laser light source light may (also) be controllable, the optical power $W_{opt,sys}$ of the lighting system light may be controllable. As indicated above, possible non-linearities in the first component optical power $W_{opt,comp1}$ may be compensated by the second component optical power $W_{opt,comp2}$, whereby the total linear dimming range of the $W_{opt,sys}$ of the lighting system light may be larger. The term "optical power" refers to the power (in Watt) of the spectral power distribution, such as of the first lighting system light component, or of the second lighting system light component, or of the lighting system light (as a whole). Hence, the optical power $W_{opt,sys}$ of the lighting system light may be controllable.

The term "second light source" may also refer to a plurality of (different) second light sources. For instance, two or more laser light sources may provide laser light source light to an optical fiber, of which the tip may provide the laser light source light (or second light source light). Hence, the term "second light source" may also refer to "at least one second light source".

Especially, in embodiments it is assumed that basically there is a linear relation between the input power ($W_{20}$) of the laser light source and the optical output power ($W_{opt,20}$) of the laser light source light of the laser light source. Hence, especially there may be a (positive) linear relation between dimming of the laser light source and the optical power of the laser light source light.

Especially, $W_{opt,comp1}$ and $W_{opt,comp2}$ may thus be related to the light components of the lighting system light. These two light components, having their respective optical powers, are especially provided by at least the luminescent material light and the laser light source light, respectively.

Yet further, the lighting system may comprise a control system. Especially, the control system is configured to control in one or more control modes the second component optical power $W_{opt,comp2}$ of the second lighting system light component in dependence of the first component optical power $W_{opt,comp1}$ of the first lighting system light component. Hence, the control system may provide one or more control modes wherein the lighting system is controlled, more especially the lighting system light, even more especially the (ratio of the) first lighting system light component and the second lighting system light component.

For instance, in one or more control modes the second component optical power $W_{opt,comp2}$ of the second lighting system light component may be controlled in dependence of one or more of $W_{10}$, $W_{opt,10}$, $W_{opt,sys}$, and $W_{opt,comp1}$. $W_{opt,sys}$ may (indirectly) depend upon $W_{opt,comp1}$. $W_{opt,comp1}$ may (directly) depend on $W_{10}$ or $W_{opt,10}$. $W_{opt,10}$ may depend on $W_{10}$.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

As indicated above, the lighting system may be controlled according to one or more control modes. These one or more control modes are especially based on the invention, i.e. in one or another way the second component optical power $W_{opt,comp2}$ of the second lighting system light component is controlled in dependence of the first component optical power $W_{opt,comp1}$ of the first lighting system light component. However, in further embodiments the control system may also be configured to control the lighting system light according to one or more other control modes. Hence, the phrase "configured to control in one or more control modes (of the control system)" and similar phrases may especially indicate that the control system controls the lighting system according to the one or more control modes. The phrase "controlling in one or more control modes" in general indicates that there is at least one control mode; there may also be more control modes wherein the control system controls (the lighting system). Further, in general during operation a single operation mode is operational. A (second) controlling mode selected out of a subset of two or more controlling modes may be subsequent (or preceding) to another (first) controlling mode, but in general not simultaneously.

In one or more controlling modes, the control system may be configured to keep the color point of the combination of the first lighting system light component and the second lighting system light component within a predefined range, such as within +/−0.05 of a predefined color point, such as within +/−0.025 of the predefined color point, like within 0.01 of the predefined color point. Especially, the control system may be configured to keep the color point of the combination of the first lighting system light component and the second lighting system light component within +/−0.025 of the predefined color point, like within 0.01 of the predefined color point. Hence, when only the first lighting system light component or only the second lighting system light component, or when both the first lighting system light component and the second lighting system light component, are available, the color point may essentially stay the same. Hence, relative to the predefined color point the x-value and/or the y-value may differ with +/−0.025 (in the embodiment wherein the control system is configured to keep the color point of the combination of the first lighting system light component and the second lighting system light component within +/−0.025 of the predefined color point). Note that now color point in these embodiments is defined in relation to the first lighting system light component and the second lighting system light component and not in relation to the lighting system light. Would the lighting system light essentially only consist of the first lighting system light component and the second lighting system light component, then this would also apply to the color point of the lighting system light.

Alternatively or additionally, the control system may be configured to keep the dominant wavelength of the combination of the first lighting system light component and the second lighting system light component within a predefined range, such as within +/−10 nm of a predefined dominant wavelength, such as within +/−5 nm of the predefined dominant wavelength, like within 2.5 nm of the predefined dominant wavelength. Especially, the control system may be configured to keep the dominant wavelength of the combination of the first lighting system light component and the second lighting system light component within +/−5 nm of the predefined dominant wavelength, like within 2.5 nm of the predefined dominant wavelength. Hence, when only the first lighting system light component or only the second lighting system light component, or both the first lighting system light component and the second lighting system light component, are available, the dominant wavelength may essentially stay the same. Hence, relative to the predefined dominant wavelength the wavelength may differ with +/−5 nm (in the embodiment wherein the control system is configured to keep the dominant wavelength of the combination of the first lighting system light component and the second lighting system light component within +/−5 nm of the predefined dominant wavelength). Note that now the dominant wavelength in these embodiments are defined in relation to the first lighting system light component and the second lighting system light component and not in relation to the lighting system light. Would the lighting system light essentially only consist of the first lighting system light component and the second lighting system light component, then this would also apply to the dominant wavelength of the lighting system light.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of (essentially identical (or different)) light sources, such as 2-2000 solid state light sources. In embodiments, the light source may comprise one or more micro-optical elements (array of micro lenses) downstream of a single solid state light source, such as a LED, or downstream of a plurality of solid state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

The phrases "different light sources" or "a plurality of different light sources", and similar phrases, may in embodiments refer to a plurality of solid state light sources selected from at least two different bins. Likewise, the phrases "identical light sources" or "a plurality of same light sources", and similar phrases, may in embodiments refer to a plurality of solid state light sources selected from the same bin.

Of course, the term "laser light source", and similar terms, refer to light sources that include a laser, which is used to directly or indirectly generate the light source light. As indicated above, the second lighting system light component may essentially consist of the laser light source light. Hence, the laser light source is configured to directly (essentially without downstream conversion (by a luminescent material)) generate the light source light.

When a laser is used herein, the laser may especially comprise a solid state laser.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The luminescent material is especially configured downstream of the first pump light source; the latter is (thus) configured upstream of the luminescent material. Especially, the luminescent material and first pump light source are arranged in a transmissive configuration, i.e. the first pump light source light enters the luminescent material at one side of the luminescent material, and part of the first pump light source light escapes at another side of the luminescent material. In embodiments, the luminescent material is provided as luminescent material layer, such as a luminescent material comprising coating or a luminescent material comprising body. In embodiments, the luminescent material is comprised by a ceramic body or by a polymeric body. The luminescent material may e.g. be dispersed or homogeneously distributed in the ceramic body or in the polymeric body. In yet other embodiments, the luminescent material may be provided as ceramic body, such as e.g. in the case of garnet based systems (see also below). Hence, in embodiments a radiation input face may be opposite to a radiation exit face, which is especially the case in a transmissive configuration. However, in yet other embodiments the radiation input face and the radiation exit face may be the same (sur)face, which is especially the case in a reflective configuration. Hence, in embodiments a reflective configuration may also be possible.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex} < \lambda_{em}$), though in specific embodiments the luminescent material may comprise down-converter luminescent material, i.e. radiation of a larger wavelength is converted into radiation with a smaller wavelength ($\lambda_{ex} > \lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively.

The term "luminescent material" may also refer to a plurality of different luminescent materials. Examples of possible luminescent materials are indicated below.

In embodiments, luminescent materials are selected from garnets and nitrides, especially doped with trivalent cerium or divalent europium, respectively. Embodiments of garnets especially include $A_3B_5O_{12}$ garnets, wherein A in embodiments comprises one or more of Y, La, Gd, Tb and Lu, especially (at least) one or more of Y, Gd, Tb and Lu, even more especially wherein A comprises at least yttrium or lutetium, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1.

The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$.

Ce in garnets is substantially or only in the trivalent state, as is known to the person skilled in the art.

In embodiments, the first luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein x1+x2+x3=1, wherein x3>0, wherein 0<x2+x3≤0.2, wherein y1+y2=1, wherein 0≤y2≤0.2, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially x1>0, such as >0.2, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O.

As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)).

In specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein 0<x2+x3≤0.1, and wherein 0≤y2≤0.1. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein x1+x3=1, and wherein 0<x3≤0.2, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga In and Sc, wherein x1+x2+x3=1, wherein x3>0, wherein 0<x2+x3≤0.2, wherein y1+y2=1, wherein 0≤y2≤0.2. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

In embodiments, a red luminescent material may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material $(Ba,Sr,Ca)_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca).

Likewise, the material $(Ba,Sr,Ca)AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

The term "luminescent material" herein especially relates to inorganic luminescent materials, which are also sometimes indicated as phosphors. These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

The luminescent material is especially configured in an essentially static configuration relative to the first pump light source. Hence, the first pump light source and the luminescent material do not essentially move relative to each other during use of the device. However, in other embodiments the luminescent material may be comprised by a moving element, such as a phosphor wheel. In such embodiments, the luminescent material may move relative to the first pump light source.

As the first pump light source is applied to pump the luminescent material, its maximum intensity may be higher than of the second light source. However, this is not necessarily the case. In embodiments, the first pump light source has a maximum first optical power $W_{opt,10,max}$, and the laser light source has a maximum second optical power $W_{opt,20,max}$, wherein the second optical power of the laser light source light and the first optical power of the first pump light source light have a ratio $WR_{opt,max}$. In specific embodiments, $WR_{opt,max}=W_{opt,20,max}/W_{opt,10,max}$, wherein $0.001 \leq W_{opt,20,max}/W_{opt,10,max} \leq 5$, like wherein $0.001 \leq W_{opt,20,max}/W_{opt,10,max} \leq 2$. In embodiments, $0.01 \leq W_{opt,20,max}/W_{opt,10,max} \leq 2$, such as especially $0.01 \leq W_{opt,20,max}/W_{opt,10,max} \leq 1$. In specific embodiments, $W_{opt,20,max}/W_{opt,10,max} \leq 1$, like in embodiments $0.02 \leq W_{opt,20,max}/W_{opt,10,max} \leq 0.5$.

In specific embodiments, the first spectral power distribution has a band shape. In embodiments, the first spectral power distribution may have a full width half maximum (FWHM) of at least 40 nm, such as especially at least 50 nm, such as especially 75 nm, like in embodiments at least 100 nm. In general, the FWHM may be equal to or smaller than 200 nm, such as equal to or smaller than 150 nm. Yet further, in specific embodiments the first wavelength $\lambda_1$ may be a dominant wavelength (of the first lighting system light component). Hence, when the second wavelength is e.g. a peak maximum and/or dominant wavelength, the color point may not necessarily shift when quenching of the luminescent material light is compensated by adding the laser light source light.

On the CIE color coordinate space, a straight line drawn between the point for a given color and the point for the color of the illuminant can be extrapolated out so that it intersects the perimeter of the space in two points. The point of intersection nearer to the color in question reveals the dominant wavelength of the color as the wavelength of the pure spectral color at that intersection point. The point of intersection on the opposite side of the color space gives the complementary wavelength, which when added to the color in question in the right proportion will yield the color of the illuminant (since the illuminant point necessarily sits between these points on a straight line in CIE space, according to the definition just given).

In specific embodiments, the first light source may be based on e.g. a high lumen density (HLD) type of light source. Hence, in embodiments the first light source comprises a plurality of first pump light sources and an (elongated) luminescent concentrator, wherein the plurality of first pump light sources are configured to irradiate with the first pump light source light a radiation input face comprised by a side face of the (elongated) luminescent concentrator, and wherein the (elongated) luminescent concentrator is configured to provide the luminescent material light emanating from a radiation exit face comprised by an end face of the (elongated) luminescent concentrator. Instead of the term "luminescent concentrator" also the term "light concentrator" may be applied. The light concentrator comprises a light transmissive body. The light concentrator is especially described in relation to an elongated light transmissive body, such as a ceramic rod or a crystal, such as a single crystal. However, these aspects may also be relevant for other shaped ceramic bodies or single crystals. In specific embodiments, the luminescent body comprises a ceramic body or single crystal. The light transmissive body may have any shape, such as beam (or bar) like or rod like, however especially beam like (cuboid like). However, the light transmissive body may also be disk like, etc. The light transmissive body, such as the luminescent concentrator, might be hollow, like a tube, or might be filled with another material, like a tube filled with water or a tube filled with another solid light transmissive medium. The invention is not limited to specific embodiments of shapes, neither is the invention limited to embodiments with a single exit window or outcoupling face. Below, some specific embodiments are described in more detail. Would the light transmissive body have a circular cross-section, then the width and height may be equal (and may be defined as diameter). Especially, however, the light transmissive body has a cuboid like shape, such as a bar like shape, and is further configured to provide a single exit window. In a specific embodiment, the light transmissive body may especially have an aspect ratio larger than 1, i.e. the length is larger than the width. In general, the light transmissive body is a rod, or bar (beam), or a rectangular plate, though the light transmissive body does not necessarily have a square, rectangular or round cross-section. In general, the light source is configured to irradiate one (or more) of the longer faces (side edge), herein indicated as radiation input face, and radiation escapes from a face at a front (front edge), herein indicated as radiation exit window. The light source(s) may provide radiation to one or more side faces, and optionally an end face. Hence, there may be more than one radiation input face. Further, in general the light transmissive body comprises two substantially parallel faces, a radiation input face and opposite thereof the opposite face. These two faces define herein the width of the light transmissive body. In general, the length of these faces defines the length of the light transmissive body. However, as indicated above, and also below, the light transmissive body may have any shape, and may also include combinations of shapes. Especially, the radiation input face has a radiation input face area (A), wherein the radiation exit window has a radiation exit window area (E), and wherein the radiation input face area (A) is at least 1.5 times, even more especially at least two times larger than the radiation exit window area (E), especially at least 5 times larger, such as in the range of 2-50,000, especially 5-5,000 times larger. Hence, especially the elongated light transmissive body comprises a geometrical concentration factor, defined as the ratio of the area of the radiation input faces and the area of the radiation exit window, of at least 1.5, such as at least 2, like at least 5, or much larger (see above). This allows e.g. the use of a plurality of solid state light sources (see also below). In specific embodiments, the radiation exit window and the radiation input face have an angle α unequal to 0° and unequal to 180°, such as having an angle α of 90°. Further, in specific embodiments the radiation input window has an angle unequal to 0° and unequal to 1800 with one or more of the one or more side faces, such as angle(s) of 90°. Further, in embodiments the radiation exit window and the radiation input face have an angle (a) unequal to 0° and unequal to 180°. Yet further, in embodiments the radiation exit window has an angle unequal to 0° and unequal to 1800 with one or more of the one or more side faces, especially all of the side faces. Note that the angle α may differ per for different side faces. For instance, a slanted radiation exit window of a bar shaped elongated body may have an angle of a1 with a first side face, an angle α2=180°−α1 with a second side face, and angles of 90° with the two other side faces. For typical applications like in automotive, digital projectors, or high brightness spotlight applications, a small but high radiant flux or luminous flux emissive surface is desired. This cannot be obtained with a single LED, but can be obtained with the present light generating device. Especially, the radiation exit window has a radiation exit window area (E) selected from the range of 1-100 mm². With such dimensions, the emissive surface can be small, whereas nevertheless high radiance or luminance may be achieved. As indicated above, the light transmissive body in general has an aspect ratio (of length/width). This allows a small radiation exit surface, but a large radiation input surface, e.g. irradiated with a plurality of solid state light sources. In a specific embodiment, the light transmissive body has a width (W) selected from the range of 0.5-100 mm, such as 0.5-10 mm. The light transmissive body is thus especially an integral body, having the herein indicated faces. In yet further embodiments, the elongated light transmissive body (of the luminescent concentrator) comprises an elongated ceramic body. For instance, luminescent ceramic garnets doped with $Ce^{3+}$ (trivalent cerium) can be used to convert blue light into light with a longer wavelength, e.g. within the green to red wavelength region, such as in the range of about 500-750 nm, or even in the cyan. To obtain sufficient absorption and light output in desired directions, it is advantageous to use transparent rods (especially substantially shaped as beams). Such rod can be used as light concentrator, converting light source light into converter radiation and providing at an exit surface (a substantial amount of) (concentrated) converter radiation. Light generating devices based on light concentrators may e.g. be of interest for projector applications. For projectors, red, yellow, green and blue luminescent concentrators are of interest. Green and/or yellow luminescent rods, based on garnets, can be relatively efficient. Such concentrators are especially based on YAG:Ce (i.e. $Y_3Al_5O_{12}:Ce^{3+}$) or LuAG, which can be indicated as $(Y_{1-x}Lu_x)_3Al_5O_{12}:Ce^{3+}$, where $0 \le x \le 1$, such as in embodiments $Lu_3Al_5O_{12}:Ce^{3+}$: 'Red' garnets can be made by doping a YAG-garnet with Gd ("YGdAG"). Cyan emitters can be made by e.g. replacing (part of the) Al (in e.g. LuAG) by Ga (to provide "LuGaAG"). Blue luminescent concentrators can be based on YSO ($Y_2SiO_5:Ce^{3+}$) or similar compounds or BAM ($BaMgAl_{10}O_{17}:Eu^{2+}$) or similar compounds, especially configured as single crystal(s). The term similar compounds especially refer to compounds having the same crystallographic structure but where one or more cations are at least partially replaced with another cation (e.g. Y replacing with Lu and/or Gd, or Ba replacing with Sr). Optionally, also anions may be at least partially replaced, or cation-anion combinations, such as replacing at least part of the Al—O with Si—N. Hence, especially the elongated light transmissive body comprises a ceramic material configured to wavelength convert at least part of the (blue) light source light into converter radiation in e.g. one or more of the green, yellow and red, which converter radiation at least partly escapes from the radiation exit window. In embodiments, the ceramic material especially comprises an $A_3BO_{12}:Ce^{3+}$ ceramic material ("ceramic garnet"), wherein A comprises yttrium (Y) and/or lutetium (Lu) and/or gadolinium (Gd), and wherein B comprises aluminum (Al) and/or gallium (Ga), especially at least Al. As further indicated below, A may also refer to other rare earth elements and B may include Al only, but may optionally also include gallium. The formula $A_3BO_{12}:Ce^{3+}$ especially indicates the chemical formula, i.e. the stoichiometry of the different type of elements A, B and O (3:5:12). However, as known in the art the compounds indicated by such formula may optionally also include a small deviation from stoichiometry. Especially in relation to the concentrator, it is further referred to WO2006/054203.

Alternatively or additionally, in embodiments the first light source may comprise a solid state laser light source. Hence, especially the laser light source comprises a solid state laser light source. As can be derived from the above, the term "solid state laser light source" may also refer to a plurality of (different) solid state laser light sources.

Best results may be obtained when the first lighting system light component and the second lighting system light component have essentially the same color point. Hence, the peak wavelengths or dominant wavelengths, respectively, may essentially be the same. Therefore, in specific embodiments the second wavelength $\lambda_2$ may especially be selected from the range of $\lambda_1-10$ nm$\leq\lambda_2\leq\lambda_1+10$ nm. Especially, both $\lambda_1$ and $\lambda_2$ are selected as peak wavelengths. Alternatively, both $\lambda_1$ and $\lambda_2$ are selected as dominant wavelengths.

As the quenching may only occur over a specific value of the first component optical power $W_{opt,comp1}$ of the first lighting system light component, it may be useful in embodiments to only introduce the second lighting system light component at (or over) values of the first component optical power $W_{opt,comp1}$ of the first lighting system light component where quenching occurs. Hence, in embodiments the control system may be configured to control in a (first) control mode the second component optical power $W_{opt,comp2}$ of the second lighting system light component in dependence of the first component optical power $W_{opt,comp1}$ of the first lighting system light component only above a predetermined threshold value of the first component optical power $W_{opt,comp1}$ of the first lighting system light component. Hence, below predetermined threshold value of the first component optical power $W_{opt,comp1}$ of the first lighting system light component the second lighting system light component may essentially be absent. Alternatively, below predetermined threshold value of the first component optical power $W_{opt,comp1}$ of the first lighting system light component the second lighting system light component may be relatively low, such as a threshold value of $W_{opt,comp1}$ of at maximum 50%, like at maximum 40%, or at maximum 20% of $W_{opt,10,max}$. However, a threshold of about 70% of $W_{opt,10,max}$ may also be possible. Such embodiments wherein $W_{opt,comp2}$ may be relatively low or even absent below a certain threshold value of $W_{opt,comp1}$, may allow a relatively high quality light, such as in terms of CRI, at lower brightness values.

Hence, in embodiments the first pump light source may have a first dimming range over which the first pump light source can be up dimmed and down dimmed, wherein over a first part of the first dimming range there is a linear relation between dimming levels within the first part of the first dimming range and the first component optical power $W_{opt,comp1}$ of the first lighting system light component, wherein over a second part of the first dimming range there is a non-linear (positive) relation between dimming levels within the second part of the first dimming range and first component optical power $W_{opt,comp1}$ of the first lighting system light component. Hence, when increasing the power (in Watt) of the pump light source, the first component optical power $W_{opt,comp1}$ of the first lighting system light component increases over the first dimming range linearly, whereas over a second part there may be increase but non-linear. With the term "positive" it is indicated that an increase or decrease of the power there is also an increase or decrease, respectively of the first component optical power $W_{opt,comp1}$ of the first lighting system light component. Note that when decreasing the power (in Watt) of the pump light source, the first component optical power $W_{opt,comp1}$ of the first lighting system light component decreases over the first dimming range linearly, whereas over a second part there may be decrease but non-linear.

Also the laser light source may comprise a dimming range, indicated as second dimming range, over which the laser light source can be up dimmed and down dimmed. Especially, over the dimming range of the laser light source, the second component optical power $W_{opt,comp2}$ of the second lighting system light component may essentially increase (up dimming) or decrease down dimming) linear.

Herein, the terms "dimming" and "dim" and similar terms refer to both options of up dimming and down dimming.

The first pump light source and the laser light source may each have a respective dimming range. The dimming range may refer to the range between 0 Watt and the maximum Watt between which the respect light source may be driven. This especially refers to the power provided to the respective light source. The maximum optical power of the first pump light source and laser light source are herein indicated with $W_{opt,10,max}$ and $W_{opt,20,max}$, respectively.

Dimming, be it up dimming or down dimming, may be done stepwise or gradually. The term "dimming" especially indicates that there is at least one, in general a plurality of intermediate values between 0 Watt and $W_{opt,10,max}$ or $W_{opt,20,max}$, respectively.

Hence, when referring to the dimming range of the first pump light source and the (second) laser light source, it is especially referred to the power (in Watt) provided to the respective light source.

Especially, there may be a linear relation between the power provided to the pump light source $W_{10}$ and the optical power of the first pump light source light $W_{opt,10}$. Hence, over a substantial part, if not essentially the entire part, of the dimming range, a ratio between $W_{opt,10}$ and $W_{10}$ may essentially be constant. Likewise, especially there may be a linear relation between the power provided to the laser light source $W_{20}$ and the optical power of the laser light source light $W_{opt,20}$. Hence, over a substantial part, if not essentially the entire part, of the dimming range, a ratio between $W_{opt,20}$ and $W_{20}$ may essentially be constant.

As indicated above, in embodiments the second component optical power $W_{opt,comp2}$ of the second lighting system light component may essentially be zero below a predetermined of the first component optical power $W_{opt,comp1}$ of the first lighting system light component. However, this is not necessarily the case. The second component optical power $W_{opt,comp2}$ of the first lighting system light component may in embodiments also be larger than zero below the threshold value, and e.g. linear or non-linear increase with increasing first component optical power $W_{opt,comp1}$ of the first lighting system light component. Hence, in embodiments in one or more of the herein described (respective) control modes in the first part of the first dimming range $WR_{comp}>0$. As indicated above, in other embodiments, in the first part of the first dimming range $WR_{comp}=0$.

Especially, a ratio $WR_{comp}$ of the second component optical power $W_{opt,comp2}$ of the second lighting system light component and the first component optical power $W_{opt,comp1}$ of the first lighting system light component may (thus) be defined as $WR_{comp}=W_{opt,comp2}/W_{opt,comp1}$.

In embodiments the control system may be configured to control in a (second) control mode a ratio $WR_{comp}$ of the second component optical power $W_{opt,comp2}$ of the second lighting system light component and the first component optical power $W_{opt,comp1}$ of the first lighting system light component $WR_{comp}=W_{opt,comp2}/W_{opt,comp1}$, wherein in the second control mode $WR_{comp}$ is larger in the second part of the first dimming range than in the first part of the first dimming range.

As over a first dimming level $W_{10,x}$ (of the first pump light source) the luminescent material light may quench, above (but in embodiments also already below this first dimming level) the contribution of the second component optical power $W_{opt,comp2}$ of the second lighting system light component may be increased when up dimming over the first dimming level $W_{10,x}$. Hence, in embodiments wherein over (i.e. above) a first dimming level $W_{10},x$ the luminescent material light quenches, in embodiments the control system may be configured to increase $WR_{comp}$ when a dimming level of the first dimming range is equal to or higher than $0.7*W_{10,x}$, especially equal to or higher than $0.9*W_{10,x}$. Herein, $W_{10,x}$ of the first pump light source refers to power of the first pump light source at which the luminescent material may start to quench.

Alternatively or additionally, in embodiments the control system may be configured to increase $WR_{comp}$ when $W_{opt,comp1}$ is equal to or higher than $0.2*W_{opt,10,max}$. In other embodiments, the control system may be configured to increase $WR_{comp}$ when $W_{opt,comp1}$ is equal to or higher than $0.4*W_{opt,10,max}$. In other embodiments, the control system may be configured to increase $WR_{comp}$ when $W_{opt,comp1}$ is equal to or higher than $0.5*W_{opt,10,max}$. In yet further specific embodiments, the control system may be configured to increase $WR_{comp}$ when $W_{opt,comp1}$ is equal to or higher than $0.7*W_{opt,10,max}$.

In embodiments, the control system may be configured to keep $WR_{comp}$ constant $W_{opt,comp1}$ is smaller than $0.2*W_{opt,10,max}$. In other embodiments, the control system may be configured to keep $WR_{comp}$ constant $W_{opt,comp1}$ is smaller than $0.4*W_{opt,10,max}$. In other embodiments, the control system may be configured to keep $WR_{comp}$ constant $W_{opt,comp1}$ is smaller than $0.5*W_{opt,10,max}$. In yet further specific embodiments, the control system may be configured to keep $WR_{comp}$ constant $W_{opt,comp1}$ is smaller than $0.7*W_{opt,10,max}$.

It may even be the case that when increasing the power of the first pump light source, as certain power levels the spectral power of the first lighting system light component even decreases with increasing power of the first pump light source. In such ranges, there is a negative relation. Hence, in embodiments wherein over a third part of the first dimming range there is a negative relation between dimming levels within the third part of the first dimming range and the first component optical power $W_{opt,comp1}$ of the first lighting system light component, the control system may be configured to control in a third control mode the ratio $WR_{comp}$ (as defined above), wherein in the third control mode $WR_{comp}$ is larger in the third part of the first dimming range than in the second part of the first dimming range.

The second part of the dimming range is at higher dimming levels than the first part of the dimming range. Likewise, a third part of the dimming range is at higher levels than the second part of the dimming range.

Hence, in specific embodiments, the control system may be configured to increase in a fourth control mode the second component optical power $W_{opt,comp2}$ with increasing optical power $W_{opt,sys}$ of the lighting system light, wherein over at least part of a dimming range of the optical power $W_{opt,sys}$ of the lighting system light there is a linear or non-linear relation between the second component optical power $W_{opt,comp2}$ with increasing optical power $W_{opt,sys}$ of the lighting system light, wherein over at least part of the dimming range of the optical power $W_{opt,sys}$ of the lighting system light the ratio $WR_{comp}$ (as defined above) increases with up dimming. In embodiments, there is a linear relation between the second component optical power $W_{opt,comp2}$ with increasing optical power $W_{opt,sys}$ of the lighting system light. In other embodiments, there is a non-linear relation between the second component optical power $W_{opt,comp2}$ with increasing optical power $W_{opt,sys}$ of the lighting system light. Especially when quenching is substantial, with increase increasing optical power $W_{opt,sys}$ of the lighting system light it may be useful to non-linearly increase the second component optical power $W_{opt,comp2}$, e.g. to maintain the color point even at higher optical power $W_{opt,sys}$ of the lighting system light.

Hence, in embodiments when up dimming, $WR_{comp}$ may be increased over a specific threshold value of one or more of $W_{10}$, $W_{opt,10}$, $W_{opt,sys}$, and $W_{opt,comp1}$. When down dimming, $WR_{comp}$ may be decreased under a specific threshold value of one or more of $W_{10}$, $W_{opt,10}$, $W_{opt,sys}$, and $W_{opt,comp1}$. Hence, below the specific threshold value(s) (of one or more of $W_{10}$, $W_{opt,10}$, $W_{opt,sys}$, and $W_{opt,comp1}$) the $WR_{comp}$ value(s) may be chosen to be lower than above the threshold value(s). The phrase "may be increased over a specific threshold value" and similar phrased indicates that a value, especially of $WR_{comp}$ may be increased, when another value reaches a specific threshold value. For instance, $WR_{comp}$ may be increased when $W_{10}$ or $W_{opt,10}$ reach a specific (predetermined) threshold value. Hence, the phrase "$WR_{comp}$ may be increased over a specific threshold value of $W_{10}$", and similar phrases does not imply that $WR_{comp}$ gets a value larger than the threshold $W_{10}$, (note that the former is a ratio and the latter is a power), but especially implies that when $W_{10}$ reaches during up dimming a threshold value, then $WR_{comp}$ may be increased. Likewise this may apply for down dimming, i.e. that when $W_{10}$ reaches during down dimming a threshold value, then $WR_{comp}$ may be decreased. The phrase "$WR_{comp}$ may be increased", and similar phrases, may also imply that with further up dimming, $WR_{comp}$ may further be increased. Likewise, the phrase "$WR_{comp}$ may be decreased", and similar phrases, may also imply that with further down dimming, $WR_{comp}$ may further be decreased. As indicated above, however, in some embodiments $WR_{comp}$ may be kept constant under a specific threshold value of one or more parameters like $W_{10}$, $W_{opt,10}$, $W_{opt,sys}$, and $W_{opt,comp1}$.

As indicated above, in embodiments the control system may be configured to control in one or more control modes the second component optical power $W_{opt,comp2}$ of the second lighting system light component in dependence of one or more of $W_{10}$, $W_{opt,10}$, $W_{opt,sys}$, and $W_{opt,comp1}$. Especially, in embodiments the control system may be configured to increase $WR_{comp}$ (during up dimming) over a threshold value of one or more of $W_{10}$, $W_{opt,10}$, $W_{opt,sys}$, and $W_{opt,comp1}$. This implies that when during operation there is up dimmed over a value of one or more of $W_{10}$, $W_{opt,10}$, $W_{opt,sys}$, and $W_{opt,comp1}$, $WR_{comp}$ is increased, i.e. (relatively) more of the second component may be provided (relative to the first component).

Hence, the second component optical power $W_{opt,comp2}$ of the second lighting system light component may be controlled in dependence of $W_{10}$. Alternatively or additionally, the second component optical power $W_{opt,comp2}$ of the second lighting system light component may be controlled in dependence of $W_{opt,10}$. Alternatively or additionally, the second component optical power $W_{opt,comp2}$ of the second lighting system light component may be controlled in dependence of $W_{opt,sys}$. Alternatively or additionally, the second component optical power $W_{opt,comp2}$ of the second lighting system light component may be controlled in dependence of $W_{opt,comp1}$. As indicated above, when controlling one or more of $W_{10}$, $W_{opt,10}$, and $W_{opt,sys}$, effectively also $W_{opt,comp1}$ may be controlled.

The threshold value may in embodiments be a fraction of the maximum of the input power $W_{10}$ of the pump light source, i.e. a fraction of $W_{10,max}$. Hence, in embodiments the control system may be configured to increase $WR_{comp}$ (during up dimming of $W_{10}$) over a threshold value of $a*W_{10,max}$, wherein especially $0<a\leq1$, such as e.g. $0<a\leq0.7$ or $0<a\leq0.5$. However, other values may also be possible. Hence, when $W_{10}$ reaches the threshold value of $a*W_{10,max}$, and passes this value with (further) up dimming or would pass this value when further up dimming would be possible, then $WR_{comp}$ may be increased. Likewise, when during down dimming $W_{10}$ reduces to the threshold $a*W_{10,max}$ and decreases below this threshold value of $a*W_{10,max}$, $WR_{comp}$ may be decreased.

The threshold value may in embodiments be a fraction of the maximum of the optical power $W_{opt,10}$ of the pump light source light, i.e. a fraction of $W_{opt,10,max}$. Hence, alternatively or additionally in embodiments the control system may be configured to increase $WR_{comp}$ (during up dimming of $W_{opt,10}$ (or $W_{10}$)) over a threshold value of $b*W_{opt,10,max}$, wherein especially $0<b\leq1$, such as e.g. $0<b\leq0.7$ or $0<b\leq0.5$. However, other values may also be possible. Hence, when $W_{opt,10}$ reaches the threshold value of $b*W_{opt,10,max}$, and passes this value with (further) up dimming or would pass this value when further up dimming would be possible, then $WR_{comp}$ may be increased. Likewise, when during down dimming $W_{opt,10}$ reduces to the threshold $b*W_{opt,10,max}$ and decreases below this threshold value of $b*W_{opt,10,max}$, $WR_{comp}$ may be decreased.

The threshold value may in embodiments be a fraction of the maximum of the optical power $W_{opt,sys}$ of the system light, i.e. a fraction of $W_{opt,sys,max}$. Hence, alternatively or additionally in embodiments the control system may be configured to increase $WR_{comp}$ (during up dimming of $W_{opt,sys}$) over a threshold value of $c*W_{opt,sys,max}$, wherein especially $0<c<1$, such as e.g. $0<c\leq0.7$ or $0<c\leq0.5$. However, other values may also be possible. Hence, when $W_{opt,sys}$ reaches the threshold value of $c*W_{opt,sys,max}$, and passes this value with (further) up dimming, then $WR_{comp}$ may be increased. Likewise, when during down dimming $W_{opt,sys}$ reduces to the threshold $c*W_{opt,sys,max}$ and decreases below this threshold value of $c*W_{opt,sys,max}$, $WR_{comp}$ may be decreased.

The threshold value may in embodiments be a fraction of the maximum of the optical power $W_{opt,comp1}$ of the first lighting system light component, i.e. of $W_{opt,comp1,max}$. Hence, alternatively or additionally in embodiments the control system may be configured to increase $WR_{comp}$ (during up dimming of $W_{opt,comp1}$ (or $W_{10}$)) over a threshold value of $d*W_{opt,comp1,max}$, wherein $0<d\leq1$, such as e.g. $0<d\leq0.7$ or $0<c\leq0.5$, or $0<d\leq0.4$, or $0<d\leq0.2$. However, other values may also be possible. Hence, when $W_{opt,comp1}$ reaches the threshold value of $d*W_{opt,comp1,max}$ and passes this value with (further) up dimming or would pass this value when further up dimming would be possible, then $WR_{comp}$ may be increased. Likewise, when during down dimming $W_{opt,comp1}$ reduces to the threshold $d*W_{opt,comp1,max}$ and decrease below this threshold value of $d*W_{opt,comp1,max}$, $WR_{comp}$ may be decreased.

Herein, many embodiments are described in relation to up dimming. Note however that equally the embodiments may be described in relation to down dimming. For instance, referring to the just discussed embodiment, the control system may be configured to decrease in a fourth control mode the second component optical power $W_{opt,comp2}$ with decreasing optical power $W_{opt,sys}$ of the lighting system light, wherein over at least part of a dimming range of the optical power $W_{opt,sys}$ of the lighting system light there is a linear or non-linear relation between the second component optical power $W_{opt,comp2}$ with decreasing optical power $W_{opt,sys}$ of the lighting system light, wherein over at least part of the dimming range of the optical power $W_{opt,sys}$ of the lighting system light the ratio $WR_{comp}$ (as defined above) decreases with down dimming.

As indicated above, the luminescent material may be configured in a transmissive arrangement relative to the first pump light source. In general, only a relatively small part of the first pump light source light will effectively be transmitted through the luminescent material (layer), as an essential part of the first pump light source light will be absorbed by the luminescent material. However, in embodiments also the laser light source may be configured upstream of the luminescent material, and in such embodiments the luminescent material may also be configured in a transmissive arrangement for the laser light source. However, an essential part of the laser light source light may be transmitted through the luminescent material (layer). Hence, in embodiments both the first pump light source and the second light source light source may be configured upstream of the luminescent material, wherein especially the luminescent material is transmissive for the laser light source light, wherein an absorption of the laser light source light by the luminescent material is less than 10% of the laser light source light.

As indicated above, in embodiments the optional first optics may comprise a wavelength dependent optical filter, like a color filter. In embodiments the optional second optics may comprise a wavelength dependent optical filter, like a color filter. In embodiments, a single set of optics has the function of the first optics and of the second optics. In yet further embodiments, wavelength dependent optical filter may not be available. Wavelength dependent optical filter may e.g. be used to modify the spectral distribution of the luminescent material light. This may be useful in terms of tuning the color point and/or gamut.

Controlling of the optical power(s) may be done via a feed forward or feedback loop.

In embodiments, the lighting system may further comprising an optical sensor configured to receive part of the lighting system light and to provide a corresponding sensor signal, wherein the control system is configured to control in the one or more control modes the first component optical power $W_{opt,comp1}$ of the first lighting system light component and the second component optical power $W_{opt,comp2}$ of the second lighting system light component in dependence of the sensor signal. Alternatively or additionally, the lighting system may further comprising an optical sensor configured to receive part of the first pump light source light and to provide a corresponding sensor signal, wherein the control system is configured to control in the one or more control modes the first component optical power $W_{opt,comp1}$ of the first lighting system light component and the second component optical power $W_{opt,comp2}$ of the second lighting system light component may be controlled in dependence of the sensor signal. Hence, in embodiments the lighting system may further comprising an optical sensor configured to receive part of the lighting system light, or part of the first pump light source light, and to provide a corresponding sensor signal, wherein the control system is configured to control in the one or more control modes the first component optical power $W_{opt,comp1}$ of the first lighting system light component and the second component optical power $W_{opt,comp2}$ of the second lighting system light component may be controlled in dependence of the sensor signal. In embodiments wherein the optical sensor configured to receive part of the first pump light source light, in general the luminescent material will be configured remote from the pump light source.

It may be possible that the first light source and the second light source provide white system light under the appropriate ratio of the first lighting system light component and second lighting system light component. Alternatively or additionally, in embodiments white light may be generated on the bases of the first light source, the second light source, and a further light source. Especially, such further light source (herein also indicated as third light source) may also be controllable.

Hence, in embodiments the lighting system may further comprising a third light source configured to generate third light source light, wherein in the one or more controlling modes the lighting system light comprises (a) one or more of the first lighting system light component and the second lighting system light component, and (b) optionally a third lighting system component having a third component optical power $W_{opt,comp3}$, wherein the third lighting system light component comprises the third light source light, wherein the third lighting system light component has a third spectral power distribution, different from the first spectral power distribution and (different from) the second spectral power distribution, and wherein the control system is further configured to control in the one or more controlling modes also the third component optical power $W_{opt,comp3}$ of the third lighting system light component. Especially, the third optical power of the third light source light is controllable. Thereby, the third component optical power $W_{opt,comp3}$ of the third lighting system light component may be controllable.

Note that in one or more control modes, or even in all control modes, the lighting system may provide lighting system light that is not white. Especially, however, in embodiments one or more control modes may provide white lighting system light. The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

The terms "visible", "visible light" or "visible emission" and similar terms refer to light having one or more wavelengths in the range of about 380-780 nm.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, etc. The lighting system may also be comprised in an endoscopy system; hence, the lighting system may be applied for endoscopy.

Hence, in yet a further aspect, the invention also provides a projection system or a luminaire comprising the lighting system as defined herein.

In yet a further aspect, the invention also provide a method for controlling lighting system light of a lighting system, wherein the lighting system comprises the first light source as defined herein and the second light source as defined herein, wherein the method comprises controlling in a control mode the second component optical power $W_{opt,comp2}$ of the second lighting system light component may be controlled in dependence of the first component optical power $W_{opt,comp1}$ of the first lighting system light component. Especially, the method may comprise compensating non-linear dimming behavior of the first lighting system light component with the second lighting system light component. In embodiments, the method may comprise (when up dimming) increasing $WR_{comp}$ over a specific threshold value of one or more of $W_{10}$, $W_{opt,10}$, $W_{opt,sys}$, and $W_{opt,comp1}$. Likewise, in embodiments the method may comprise (when down dimming) decreasing $WR_{comp}$ under a specific threshold value of one or more of $W_{10}$, $W_{opt,10}$, $W_{opt,sys}$, and $W_{opt,comp1}$. Hence, below the specific threshold value(s) the $WR_{comp}$ value(s) may be lower than above the threshold value(s). In embodiments, the method may comprise keeping the color point and/or the dominant wavelength of the combination of the first lighting system light component and the second lighting system light component essentially constant over the dimming range of the lighting system light (i.e. especially over the dimming range of $W_{opt,sys}$).

The invention also provides a software product to execute this method and/or a control system to execute this method.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 1-10*b* schematically depict some embodiments;

DETAILED DESCRIPTION OF THE EMBODIMENTS

Figures 1A, 1B:
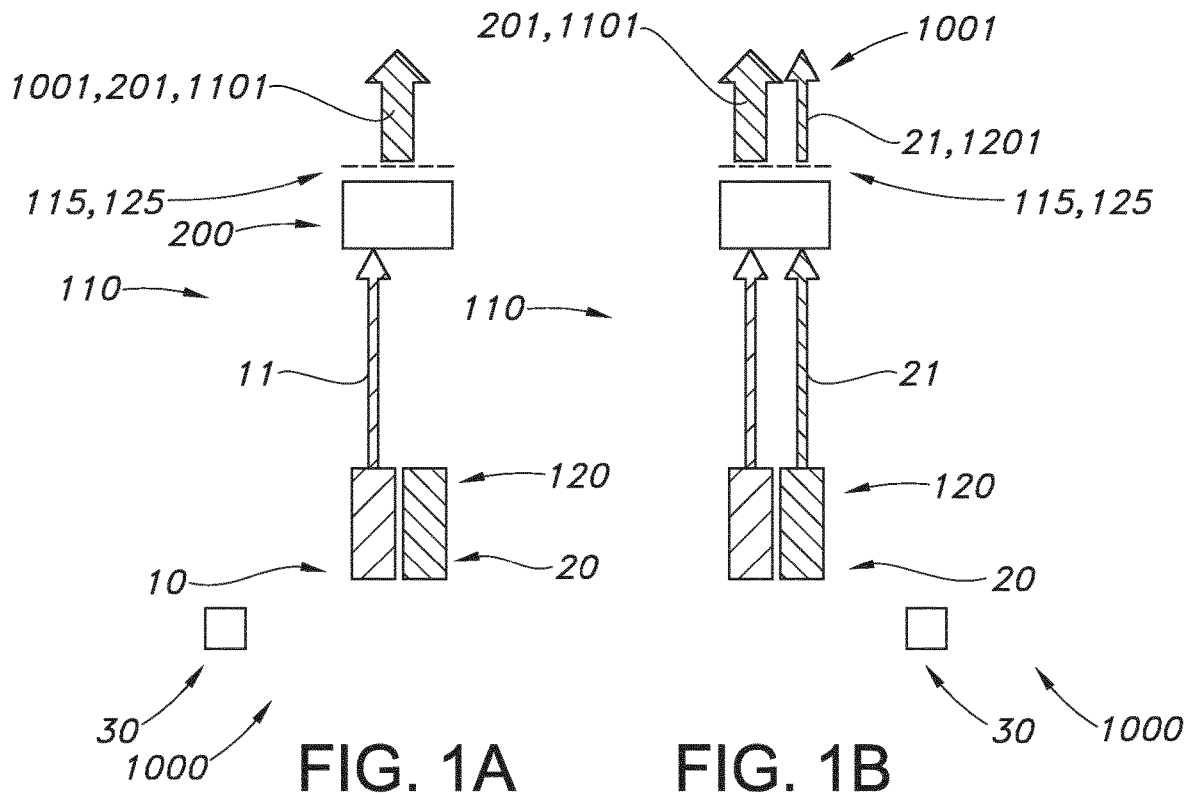

In the present invention, amongst others it is suggested to use a laser phosphor based light source, which may have an improved brightness. In embodiments, it is proposed to use a phosphor for conversion of blue laser light, such as up to the saturation point (temperature and or intensity saturation whichever comes first). In embodiments, above this point when even higher converted light intensity is required, the laser light can be added to the system. For example, blue laser light may be used in order to obtain green light using a luminescent material that converts the blue light into green light. At the point of saturation, green laser light can be added to the system for obtaining a higher intensity, see e.g. FIG. 1, where on the left (FIG. 1a) no laser light is added, and on the right (FIG. 1b), laser light is added. For instance, in embodiments the phosphor converted light has a peak wavelength λ, the green laser light has a peak wavelength Y. Especially, Y is in the range from X−30 nm and X+30 nm, more especially in the range from X−20 nm and X+20 nm, even more especially in the range from X−10 nm and X+10 nm.

In the arrangement shown in FIG. 1, the configuration is a transmissive configuration in the sense that the first pump light source is configured upstream of the luminescent material (layer) and luminescent material light that escapes from the opposite side of the luminescent material (layer) is used as at least part of the lighting system light. Further, the arrangement shown in FIG. 1 is also a transmissive configuration as the laser light source light is provided to one side of the luminescent material (layer) is at least partly, more especially essentially completely, transmitted through the luminescent material (layer). Especially, the absorption of laser light is less than 10%, more especially less than 5%, yet even more especially less than about 3%.

FIG. 1 schematically depicts an embodiment of a lighting system 1000 configured to generate lighting system light 1001. The lighting system light 1001 may comprise one or more of (i) a first lighting system light component 1101 having a first component optical power $W_{opt,comp1}$, and (ii) a second lighting system light component 1201 having a second component optical power $W_{opt,comp2}$. The optical power $W_{opt,sys}$ of the lighting system light 1001 may be controllable.

The lighting system 1000 comprises a first light source 110 and a second light source 120. The first light source 110 may comprise a first pump light source 10 configured to generate first pump light source light 11. The lighting system 1000, such as the first light source, may comprise also a luminescent material 200 configured to convert at least part of the first pump light source light 11 into luminescent material light 201. The first light source 110, optionally in combination with first optics (not shown) may be configured to provide the first lighting system light component 1101. The first lighting system light component 1101 especially comprises at least part of the luminescent material light 201. The first lighting system light component 1101 has a first spectral power distribution with spectral intensity at a first wavelength $λ_1$ (see also below). A first optical power of the first pump light source light 11 is controllable, whereby the first component optical power $W_{opt,comp1}$ of the first lighting system light component 1101 may be controllable. The second light source 120 may comprise a laser light source 20 configured to generate laser light source light 21. The second light source 120, optionally in combination with second optics (not depicted), may be configured to provide the second lighting system light component 1201. The second lighting system light component 1201 especially comprises at least part of the laser light source light 21. The second lighting system light component 1201 has a second spectral power distribution, different from the first spectral power distribution, with spectral intensity at a second wavelength $λ_2$ (see also below). The second wavelength $λ_2$ is especially selected from the range of $λ_1−30$ nm$≤λ_2≤λ_1+30$ nm. A second optical power of the laser light source light 21 may be controllable, whereby the second component optical power $W_{opt,comp2}$ of the second lighting system light component 1201 may be controllable.

As indicated above, the luminescent material 200 is especially configured to substantially not absorb the laser light source light 21.

Here, the luminescent material is schematically depicted configured remote from the pump light source. However, the luminescent material may also be in optical contact or even physical contact with the pump light source. When configured remote, as schematically depicted in a number of embodiments, the laser light source light 21 may propagate via the luminescent material 200 (transmission or reflection; here in some embodiments transmission is schematically depicted). In such embodiments it may especially be relevant that the luminescent material 200 is especially configured to substantially not absorb the laser light source light 21.

The system 1000 may further comprise a control system 30 especially configured to control in one or more control modes the second component optical power $W_{opt,comp2}$ of the second lighting system light component 1201 in dependence of the first component optical power $W_{opt,comp1}$ of the first lighting system light component 1101.

In FIG. 1 on the left (FIG. 1a), a mode without the second lighting system light component 1201 is shown; on the right (FIG. 1b) a mode is shown with both the first and the second lighting system light components 1101,1201, respectively.

FIG. 1, and other figures, also schematically depicts an embodiment of the lighting system 1000, wherein both the first pump light source 10 and the second light source light source 120 are configured upstream of the luminescent material 200. Especially, the luminescent material 200 is transmissive for the laser light source light 21, wherein an absorption of the laser light source light 21 by the luminescent material 200 is less than 10% of the laser light source light 21.

The first pump light source 10 may have a maximum first optical power $W_{opt,10,max}$. The laser light source 20 may have a maximum second optical power $W_{opt,20,max}$, wherein the second optical power of the laser light source light 21 and the first optical power of the first pump light source light 11 have a ratio $WR_{opt,max}$, wherein $WR_{opt,max}=W_{opt,20,max}/W_{opt,10,max}$, and wherein $0.01≤W_{opt,20,max}/W_{opt,10,max}≤1$.

References 115 and 125 refer to one or more optional first and/or second optics, which may comprise one or more wavelength dependent optical filter, e.g. to fine tune the first lighting system light component and/or second lighting system light component.

Below some examples are provided of combinations of the first light source and the second light source:

| | Pump light source color/λ range | Luminescent material light color/λ range | Pump laser light color/λ range | Possible additional light source color(s)/λ range(s) |
|---|---|---|---|---|
| 1 | UV | Blue | Blue | *green and/or yellow + red* |
| 2 | UV | Green | Green | *Blue + red* |
| 3 | UV | Yellow | Yellow | *Blue + optionally red* |
| 4 | UV | Red | Red | *Green and/or yellow + blue* |
| 5 | Blue | Green | Green | *Blue + red* |
| 6 | Blue | Yellow | Yellow | *Blue and optionally red* |
| 7 | Blue | Red | Red | *Green and/or yellow + blue* |
| 8 | Green | Yellow | Yellow | *Blue + optionally red* |
| 9 | Green | Red | Red | *Green and/or yellow + blue* |

15

In the last column (italics), possible additional colors, which may be provided by additional light sources, are indicated which could provide white light in combination with the first light source and the second light source. Bold marked options in the table are the most relevant options.

Figure 2:
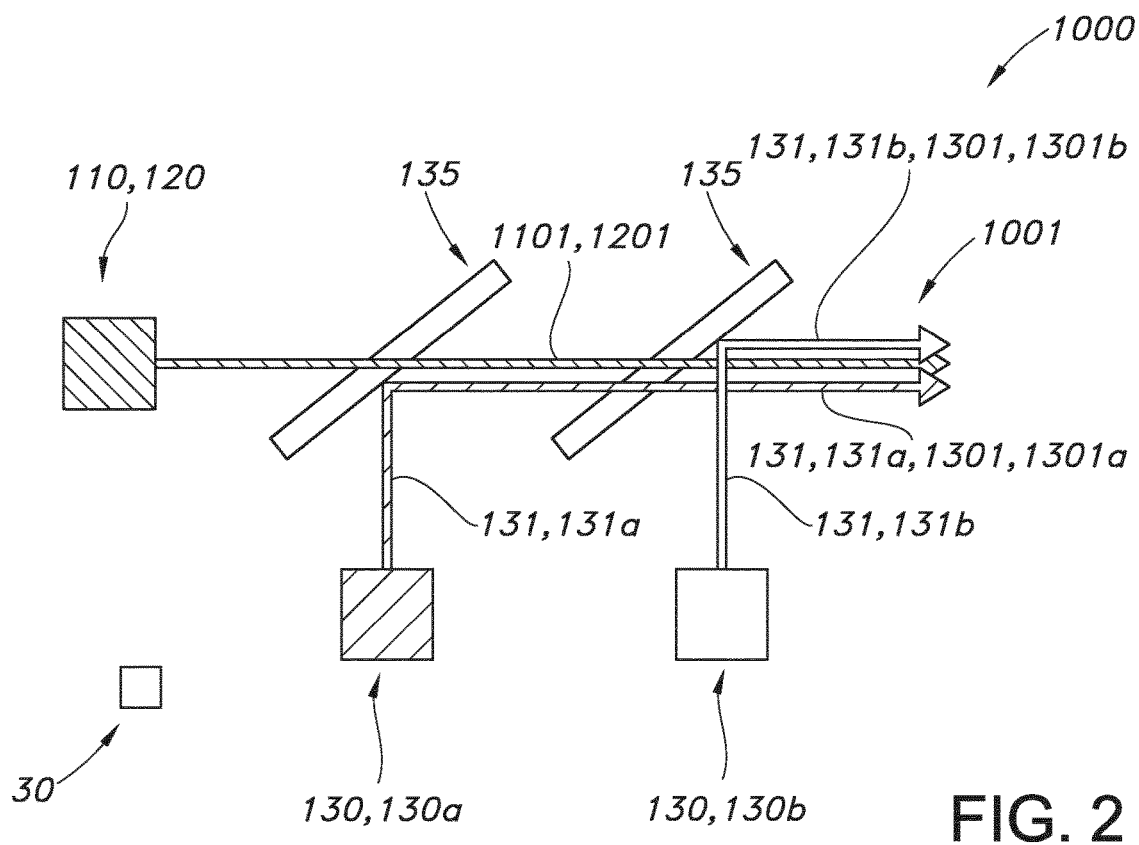

Hence, the system comprising the first light source and the second light source may e.g. be combined with other light source light, such as a solid state light lighting (SSL) light source, to obtained combined light e.g. white light. For example, the proposed green phosphor based light source may be combined with a blue and a red LED light source. Typically, dichroic mirrors may be used to combine the beams (FIG. 2). In embodiments, the prosed lighting device may be combined with other lasers e.g. a red and a blue laser. Alternatively or additionally, the proposed lighting device may also be combined with a laser and a LED light source e.g. a blue LED and a red laser.

FIG. 2 schematically depicts that one of the sources comprises the first light source 130a and the second light source 130b. These may e.g. be configured to generate green light. A first further light source 130a, configured to generate first further light source light 131a, which may e.g. be blue light and/or a second further light source 130b, configured to generate second further light source light 131b, which may e.g. be red light, may also be comprised by the system. In this way, in one or more controlling modes the lighting system light 1001 may comprise one or more of the of (i) the first lighting system light component 1101, (ii) the second lighting system light component 1201, (iii) the first further light source light 131a, and (iv) the second further light source light 131b.

Hence, FIG. 2 schematically depicts an embodiment of the lighting system 1000, further comprising a third light source 130 configured to generate third light source light 131. Especially a third optical power of the third light source light 131 is controllable.

In the one or more controlling modes, the lighting system light 1001 may comprise (a) one or more of the first lighting system light component 1101 and the second lighting system light component 1201, and (b) optionally a third lighting system component 1301 having a third component optical power $W_{opt,comp}$. The third lighting system light component 1301 may comprise the third light source light 131. The third lighting system light component 1301 may have a third spectral power distribution, different from the first spectral power distribution and different from the second spectral power distribution. A third optical power of the third light source light 131 may be controllable, whereby the third component optical power $W_{opt,comp3}$ of the third lighting system light component 1301 may be controllable. Especially, the control system 30 may further be configured to control in the one or more controlling modes also the third component optical power $W_{opt,comp3}$ of the third lighting system light component 1301.

Reference 135 refers to an optical element that reflects a part of the light and transmit a part of the light, such as a dichroic filter.

Of course, often additional optics may be used to establish a beam profile required for an application. These optics are not shown here.

In fact, FIG. 2 schematically depicts two additional third light sources 130, indicated with references 130a and 130b. Their respective third light source light 131 are indicated with 131a and 131b, respectively. Their respective third lighting system light components 1301 are indicated with references 1301a and 1301b, respectively. Of course, there can be more than two additional third light sources 130. Two or more additional third light sources 130 may refer to two or more essentially identical additional third light sources 130, such as in embodiments from the same bin. However, two or more additional third light sources 130 may also refer to two or more different types of light sources.

Together with the one or more (optionally different) third light sources 130, the lighting system 1000 may be able in control modes to generate white system light 1001.

This may e.g. be the case when first light source 110 is e.g. configured to generate green and/or yellow light, and the third light sources are configured to generate blue light or blue and red light.

Figure 3:
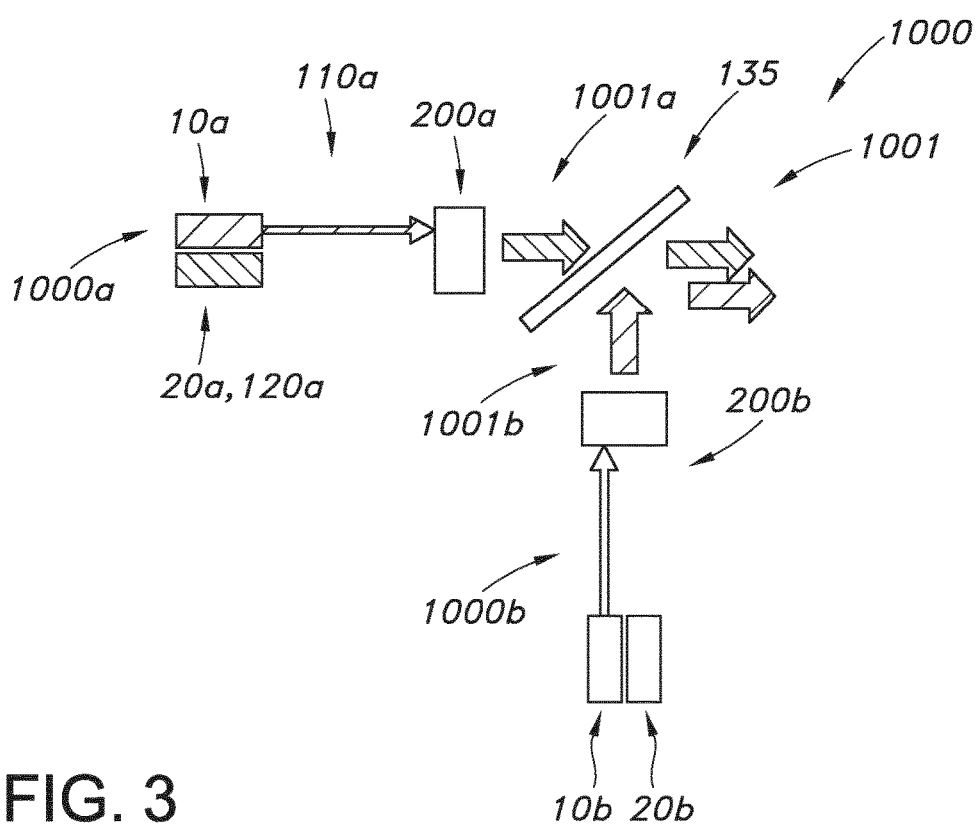
Figure 4:
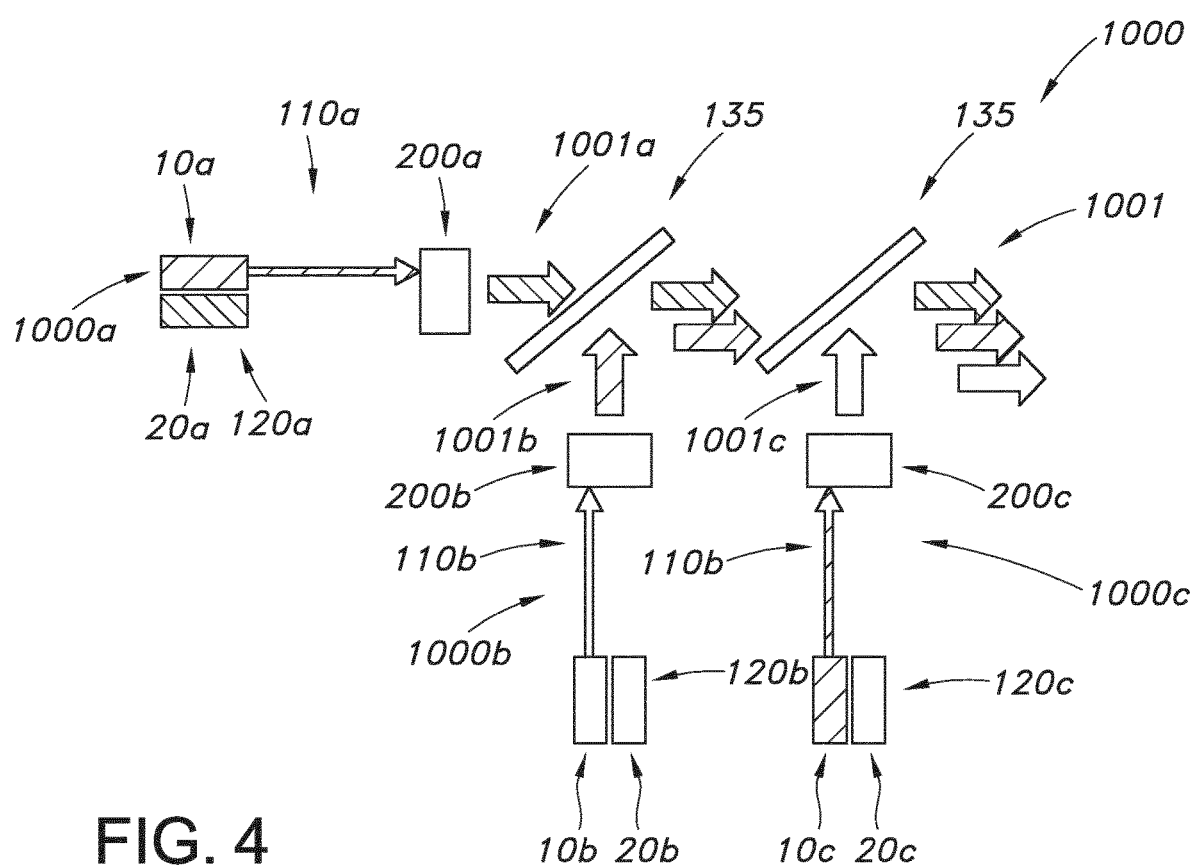

In embodiments, two or even three lighting system may be combined; see FIGS. 3-4, respectively. For instance, referring to the above table, (a) option 1, and (b) options 3 and/or 6 and/or 8 may be combined to provide white light (see FIG. 3). For instance, referring to the above table: (a) option 1, and (b) options 2 and/or 5, and (c) options 4 and/or 7 and/or 8, may be combined to provide white light (see FIG. 4). In such configurations the color point e.g. white point may be controlled over a relatively large dimming range of the system. FIG. 3 schematically depicts an embodiment of the lighting system 1000, which actually may comprise two of the herein described lighting systems, indicated with references 1000a and 1000b, which may be configured to generate lighting system light 1001a and 1001b, respectively, having different spectral power distributions. FIG. 4 schematically depicts an embodiment of the lighting system 1000, which actually may comprise three of the herein described lighting systems, indicated with references 1000a, 1000b and 1000c, which may be configured to generate lighting system light 1001a, 1001b and 1001c, respectively, having mutually different spectral power distributions. Likewise, the luminescent material 200 may be indicated as first luminescent material 200a and second luminescent material 200b, respectively. Likewise this may apply to a third luminescent material 200c. Similarly, this applies to the first light sources 110, indicated with references 110a, 110b, 110c, etc.; likewise this applies to the second light sources 120a, 120b, 120c, etc.

Hence, in embodiments the lighting system may comprise a control system 30 (or controller) for controlling the amount of laser light (FIG. 5).

Figure 7:
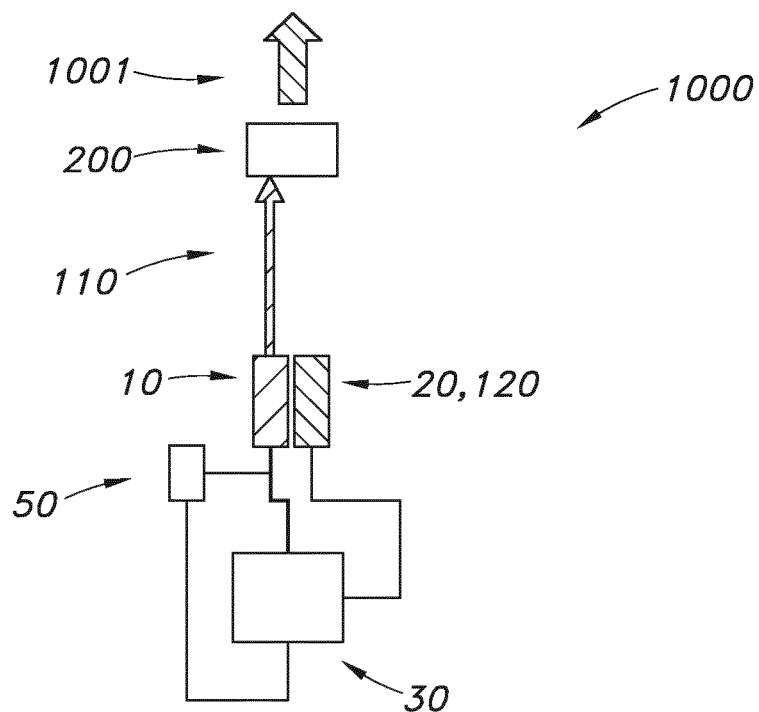
Figure 8:
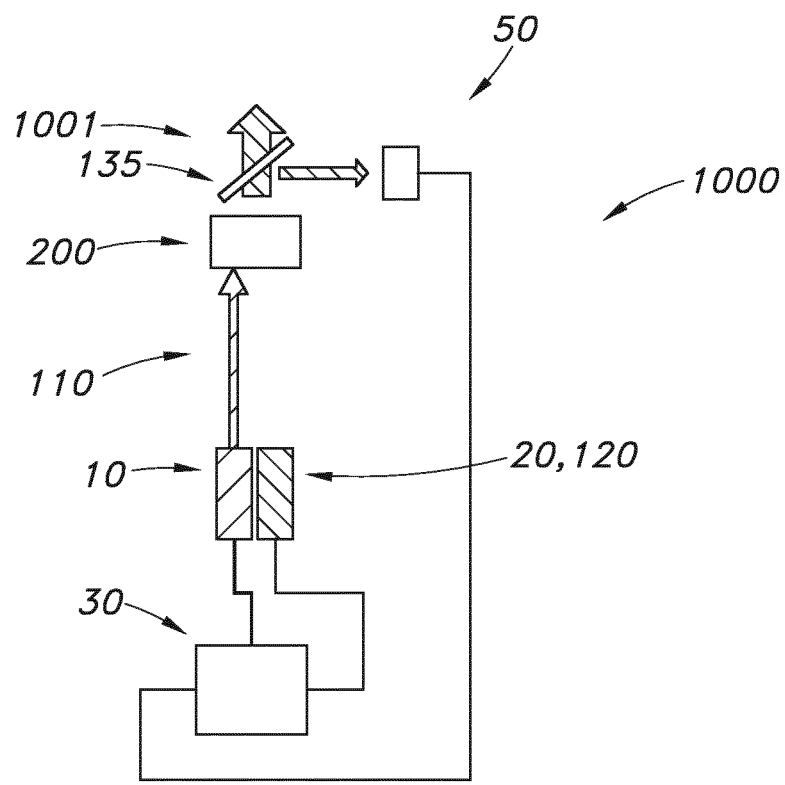

In embodiments, the lighting device may comprise a laser-output sensor (embodiment of optical sensor) measuring the amount of laser light (FIG. 6). Alternatively or additionally, the laser sensor may also be formed by a laser driving current monitor adapted for monitoring the laser driving current (FIG. 7). Alternatively or additionally, the lighting system may comprise a converted light sensor (embodiment of optical sensor) measuring the amount of converted light (FIG. 8). A sensor, such as an optical sensor, is indicated with reference 50.

Hence, FIGS. 6-8 schematically depict embodiments wherein the lighting system 1000 further comprises an (optical) sensor 50, for instance configured to receive part of the lighting system light 1001, or to measure other parameters, such as especially related to $W_{opt,comp1}$, and to provide a corresponding sensor signal, wherein the control system 30 is configured to control in the one or more control modes the first component optical power $W_{opt,comp1}$ of the first lighting system light component 1101 and the second component optical power $W_{opt,comp2}$ of the second lighting system light component 1201 in dependence of the sensor signal.

Figure 9:
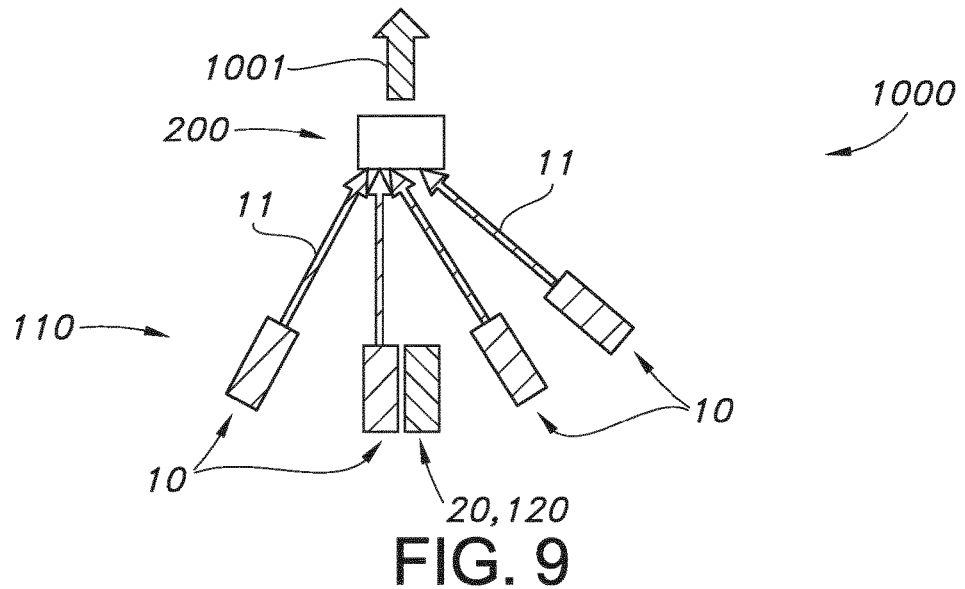

Of course, in embodiments multiple (different) light sources may be combined (FIG. 9). Here, by way of example a plurality of first light source 10 are depicted. Alternatively or additionally, a plurality of second light sources may be available. However, alternatively or additionally, also a plurality of second light sources 20 may be available (not depicted).

Figure 10A:
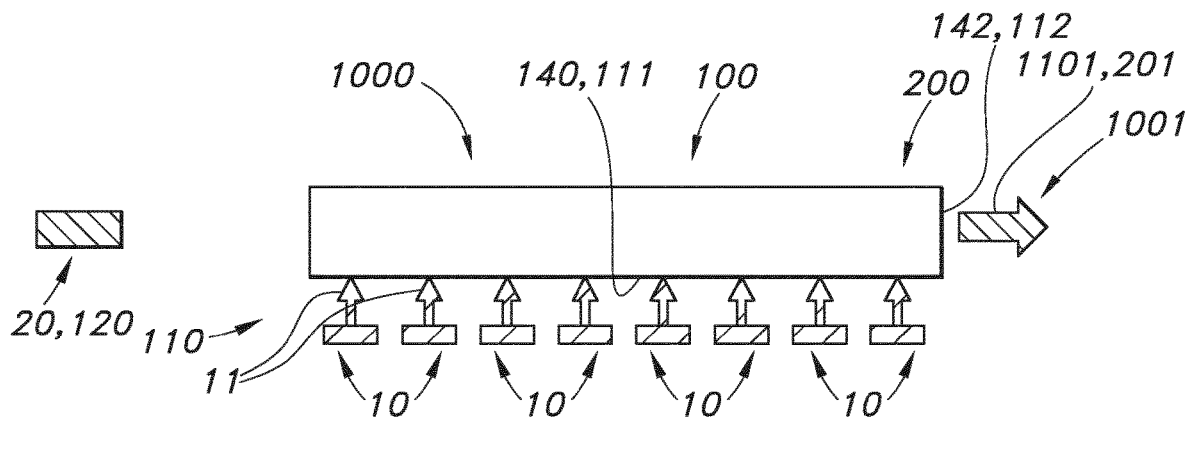
Figure 10B:
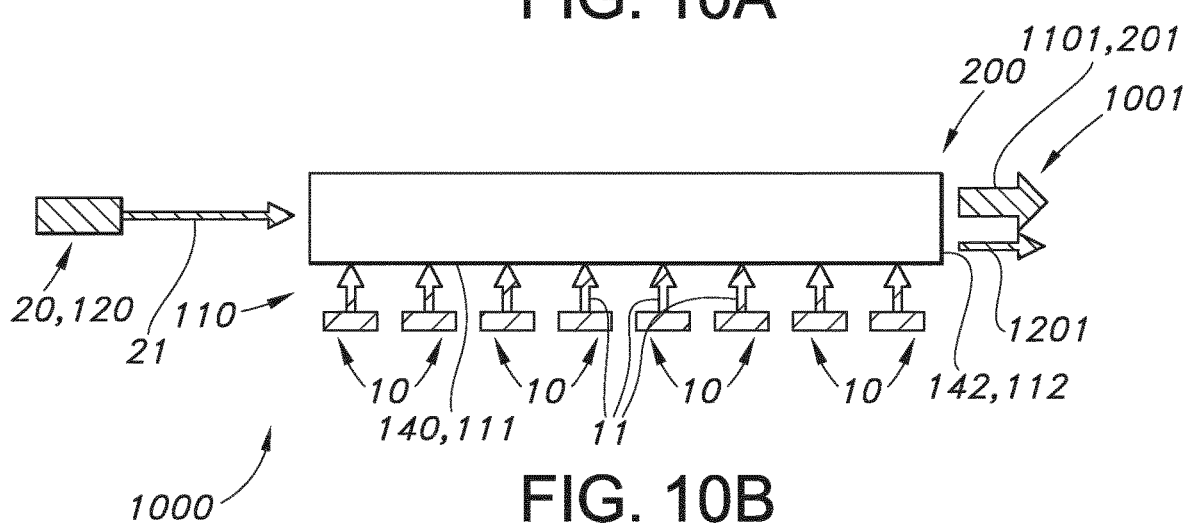

One of the light sources, may also be an HLD type light source. Hence, in embodiments instead of a laser light source pumping the phosphor, LEDs may be used to pump a transparent luminescent rod (FIG. 10). FIG. 10 schematically depicts an embodiment of the lighting system 1000, wherein the first light source 110 comprises a plurality of first pump light sources 10 and an elongated luminescent concentrator 100, wherein the plurality of first pump light sources 10 are configured to irradiate with the first pump light source light 11 a radiation input face 111 comprised by a side face 140 of the elongated luminescent concentrator 100, and wherein the elongated luminescent concentrator 100 is configured to provide the luminescent material light 201 emanating from a radiation exit face 112 comprised by an end face 142 of the elongated luminescent concentrator 100. FIG. 10a shows a mode wherein the second light source 120 does not contribute and FIG. 10b schematically depicts an embodiment wherein the second light source 120 does contribute. In the former mode the lighting system light 1001 may comprise only the first component 1101; in the latter mode the lighting system light may comprise both components 1101 and 1201. In FIG. 10a, the second component is not provided; in FIG. 10b the second component is also provided.

Figure 11A:
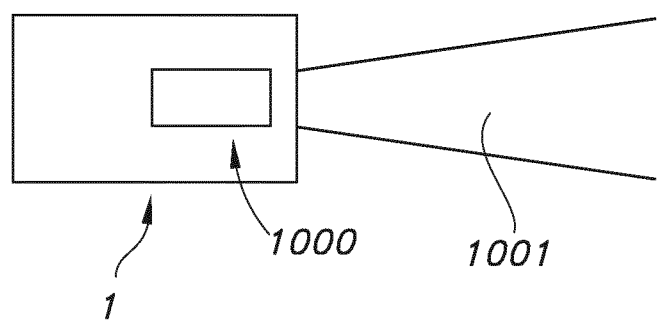
FIGS. 11*a*-11*b* schematically depict some (application) embodiments.
Figure 11B:
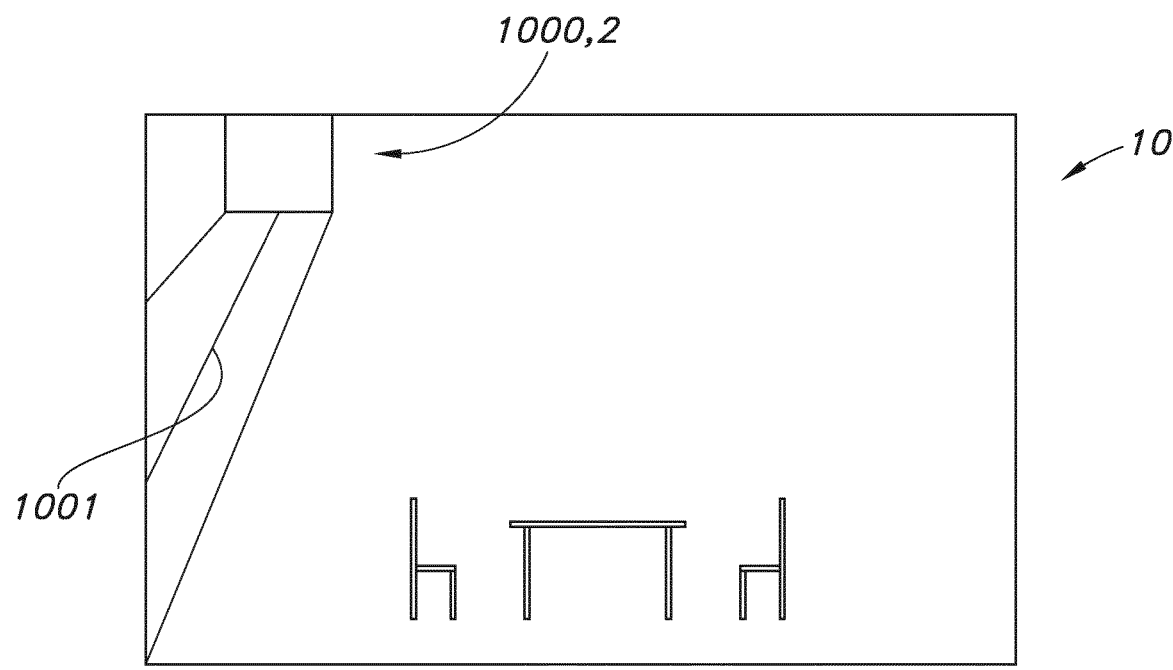

As shown in FIGS. 11a-11b, the lighting system may e.g. be comprised by a projection system 1 (11a) or a luminaire 2 (11b).

FIG. 12a-12d schematically depict some operation modes in view of possible quenching behavior.

Figure 12A:
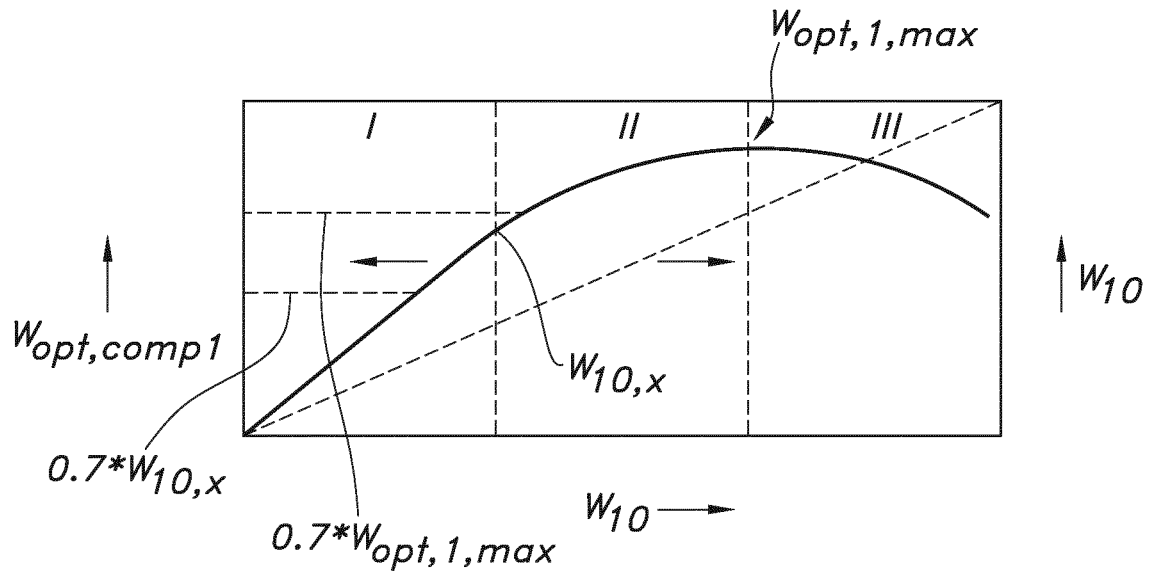
FIGS. 12*a*-12*d* schematically depict some aspects and embodiments.

FIG. 12a shows on the x-axis the power (in Watt) provided to the first laser light source. This is indicated with $W_{10}$. $W_{10}$ can e.g. vary between 0 (Watt) and $W_{10,max}$. Hence, in embodiments the dimming range of the first light source is between 0 and $W_{10,max}$. This dimming range is indicated on the x-axis. On the left y-axis $W_{opt,comp1}$ is indicated, which may vary between 0 (Watt) and a maximum value, indicated with $W_{opt,comp1,max}$. On the right y-axis (also) $W_{10}$ is indicated. As it is assumed that basically there is a linear relation between the input power and the optical output power of the pump light source, on the right y-axis also $W_{opt,10}$ could have been indicated, varying between 0 and $W_{opt,10,max}$. The dashed slanted line from the origin to the right top would then indicate the (essentially) linear relation between $W_{10}$ and $W_{opt,10}$.

FIG. 12a schematically depicts an embodiment wherein the first pump light source 10 has a first dimming range over which the first pump light source 10 can be up dimmed and down dimmed, wherein over a first part I of the first dimming range there is a linear relation between dimming levels ($W_{10}$) within the first part I of the first dimming range and the first component optical power $W_{opt,comp1}$ of the first lighting system light component. However, at the dashed vertical line between I and II, $W_{opt,comp1}$ starts to deviate from a linear (positive) relation, such as especially due to quenching. Hence, over a second part II of the first dimming range there is a non-linear (positive) relation between dimming levels within the second part of the first dimming range and first component optical power $W_{opt,comp1}$ of the first lighting system light component. Hence, in the first part I there is essentially no quenching, whereas in the second part II there is quenching, which increases with up dimming, such that at the end of the second part II there is even no increase anymore of $W_{opt,comp1}$, even when further up dimming. As indicated above, in embodiment the luminous flux from a phosphor material may increases linearly with the input power until saturation effects (thermally and/or optically induced) start to limit the conversion. FIG. 12a also schematically depicts an embodiment wherein over a third part III of the first dimming range there is (even) a negative relation between dimming levels within the third part of the first dimming range and the first component optical power $W_{opt,comp1}$ of the first lighting system light component 1101. Hence, there may be a part of the dimming range wherein the quenching reaches such levels, that an increase of the power of the laser light source effectively results in a decrease of the $W_{opt,comp1}$. In the third part III, the quenching may thus be relatively severe and has a negative impact on the converted light.

There is a ratio $WR_{comp}$ of the second component optical power $W_{opt,comp2}$ of the second lighting system light component and the first component optical power $W_{opt,comp1}$ of the first lighting system light component $WR_{comp} = W_{opt,comp2}/W_{opt,comp1}$. On the x-axis the dimming level of the first pump light source is schematically depicted. As indicated above, at the origin, the dimming level may be 0 Watt, and at the right end of the x-axis the dimming level may be indicated as $W_{10,max}$ (see also above). Over a first dimming level $W_{10,x}$ (of the pump light source) the luminescent material light may start to quench. This is indicated in the drawing with the vertical dashed line, which is indicated with $W_{10,x}$.

The dimming range of the laser light source is not depicted in FIG. 12a. However, as indicated above, it is assumed that basically there is a linear relation between the input power and the optical output power of the laser light source.

Further, FIG. 12a also schematically depict some further embodiments. One may e.g. relate the second component optical power $W_{opt,comp2}$ of the second lighting system light component 1201 and the first component optical power $W_{opt,comp1}$ of the first lighting system light component 1101 on the basis of the dimming level of the first pump light source, i.e. $W_{10}$. As it can be predetermined that at a specific value first dimming level $W_{10},x$ the luminescent material may start to quench, in embodiments it may be determined that only at a value equal to or larger than $W_{10},x$, or at another value, e.g. $a*W_{10,x}$, the second lighting system light component 1201 is generated. The value of a may e.g. be selected from the range of 0.5-1, like e.g. from the range of 0.5-0.9, like 0.5-0.7. However, the value of a may also be approximately 1. The value a=0.7 is indicated with the dashed vertical line at $0.7*W_{10,x}$. The first component optical power $W_{opt,comp1}$ associated to the specific dimming levels may be indicated with $W_{opt,comp1,x}$. Here, $W_{opt,comp1,x2}$ is the first component optical power $W_{opt,comp1}$ related $W_{10,x}$, and $W_{opt,comp1,x1}$ is the first component optical power $W_{opt,comp1}$ related $0.7*W_{10,x}$.

Hence, as will be clear to a person skilled in the art one may e.g. relate the second component optical power $W_{opt,comp2}$ of the second lighting system light component 1201 and the first component optical power $W_{opt,comp1}$ of the first lighting system light component 1101 (also) on the basis of the $W_{opt,comp1}$ (see e.g. also FIG. 6) (though other options may also be possible (see also above)). For instance, in embodiments one may choose to only add the second lighting system light component 1201 only at $W_{opt,comp1,max}$, see e.g. also FIG. 12d. However, it may also be possible to only add the second lighting system light component 1201 only at $d*W_{opt,comp1,max}$, see e.g. also FIG. 12c. The value of d may e.g. be selected from the range of 0.5-1, like e.g. from the range of 0.5-0.9, like 0.5-0.7. However, the value of d may also be approximately 1. The value d=0.7 is indicated with the dashed horizontal line $0.7*W_{opt,comp1,max}$.

However, all kind of other embodiments may also be possible. In general, however, when up dimming over a dimming threshold value $WR_{comp}$ will increase relative to the value of $WR_{comp}$ below the dimming threshold value. Likewise, hen down dimming under a dimming threshold value $WR_{comp}$ will decrease relative to the value of $WR_{comp}$ above the dimming threshold value.

Figure 12B:
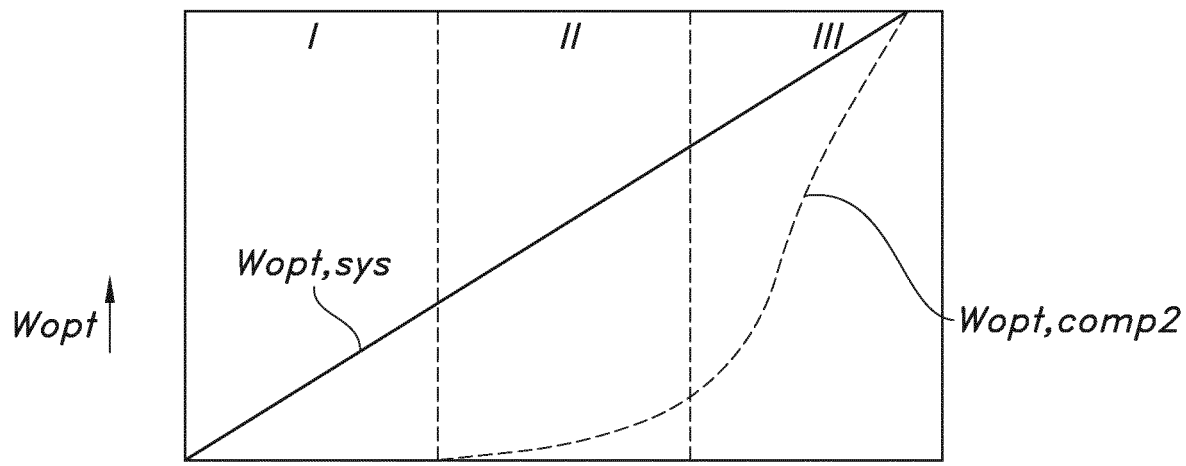

FIG. 12b schematically depicts the dimming range of the system on the lower x-as, and on the right y-axis the optical power. The straight slanted line is the optical power of the lighting system light. As schematically depicted, such straight line can be obtained by combining the first component and the second component. This can be done in several ways. FIG. 12b very schematically depicts an embodiment wherein the second lighting system optical component is introduced when up dimming leads to quenching. Hence, the second lighting system optical component starts at the vertical dashed line between the first part I and the second part II of the dimming range. The dashed curve indicates the optical power of the second lighting system optical component, i.e. $W_{opt,comp2}$. Of course, at the stage that further up dimming of the pump light source introduces an effective decease of the optical power of the first lighting system optical component $W_{opt,comp1}$, one may better keep the dimming level of the pump light source constant, and further up dim the lighting system light via the second lighting system optical component, i.e. $W_{opt,comp2}$, i.e. especially the laser light source light.

As indicated above, and as schematically depicted in an embodiment in FIG. 12b, the laser light source comprises a second dimming range over which the laser light source 20 can be up dimmed and down dimmed. Hence, in embodiments in a control mode $WR_{comp}$ is larger in the second part of the first dimming range than in the first part of the first dimming range.

The control system is especially configured to control in a one or more controlling modes the ratio $WR_{comp}$.

As schematically (also) depicted in FIG. 12b, the control system may be configured to increase in one or more controlling modes the second component optical power $W_{opt,comp2}$ with increasing optical power $W_{opt,sys}$ of the lighting system light, wherein over at least part of a dimming range of the optical power $W_{opt,sys}$ of the lighting system light there is a linear or non-linear relation between the second component optical power $W_{opt,comp2}$ with increasing optical power $W_{opt,sys}$ of the lighting system light, wherein over at least part of the dimming range of the optical power $W_{opt,sys}$ of the lighting system light 1001 the ratio $WR_{comp}$ increases with up dimming. The maximum power of the lighting system light (at least comprising one or more of, especially at least both, first lighting system light component and the second lighting system light component), may be indicated with $W_{opt,sys,max}$. As schematically depicted in FIG. 12b, when the first component optical power $W_{opt,comp1}$ shows over part of the dimming range a non-linear behavior, there will also be a non-linear relation between the second component optical power $W_{opt,comp2}$ with increasing optical power $W_{opt,sys}$ of the lighting system light, to compensate for the non-linear behavior of the first component optical power $W_{opt,comp1}$. In this way, the color point of the color component provided by the first component and second component may essentially stay the same—in the controlling mode—over the dimming range of $W_{opt,sys}$.

Figure 12C:
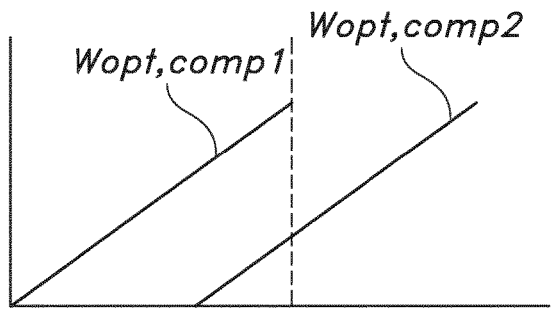
Figure 12D:
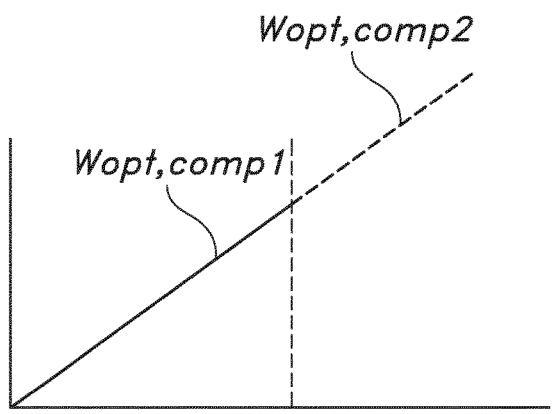

As schematically depicted in FIGS. 12c and 12d, in embodiments the control system may be configured to control in one or more controlling modes the second component optical power $W_{opt,comp2}$ of the second lighting system light component 1201 in dependence of the first component optical power $W_{opt,comp1}$ of the first lighting system light component 1101 only above a predetermined threshold value of the first component optical power $W_{opt,comp1}$ of the first lighting system light component 1101.

As schematically depicted in FIG. 12c over a first dimming level $W_{10,x}$ (see FIG. 12a) the luminescent material light 201 quenches, and the control system may be configured to increase $WR_{comp}$ when a dimming level of the first dimming range is equal to or higher than $0.7*W_{10,x}$. As (thus) also schematically depicted in FIG. 12c, in one or more control modes in the first part of the first dimming range $WR_{comp}>0$.

However, in the embodiments schematically depicted in FIGS. 12b and 12d, in one or more control modes in the first part of the first dimming range $WR_{comp}\approx0$.

In FIG. 12d also schematically an embodiment may be depicted wherein $WR_{comp}$ may be 0 in the dimming range up to the dashed vertical line (see above some non-limiting examples for threshold values). At the dashed vertical line it may be changed between $W_{opt,comp1}$ and $W_{opt,comp2}$, i.e. below a threshold value $W_{opt,comp2}$ is zero and above the threshold value $W_{opt,comp1}$ may be zero. In such instances where $W_{opt,comp1}$ is zero and $W_{opt,comp2}$ is non-zero, $WR_{comp}$ may be defined at 0.

Hence, herein also modes may be possible (than e.g. schematically depicted in FIGS. 12c and 12d) wherein essentially only the second lighting system light component 1201 is available, and optionally one or more other lighting system light components (see also below), but not the first lighting system light component 1101.

In some of the embodiments, with the system it may be possible to create over a large dimming range a linear behavior of the optical power of the lighting system light or of one or more colors within the lighting system light. However, the invention does not exclude non-linearity. For instance, the slanted line in 12B may also be curved, when desired.

Hence, in embodiments when up dimming, $WR_{comp}$ may be increased over a specific threshold value of one or more of $W_{10}$, $W_{opt,10}$, $W_{opt,sys}$, and $W_{opt,comp1}$. When down dimming, $WR_{comp}$ may be decreased under a specific threshold value of one or more of $W_{10}$, $W_{opt,10}$, $W_{opt,sys}$, and $W_{opt,comp1}$. Hence, below the specific threshold value(s) the $WR_{comp}$ value(s) may be lower than above the threshold value(s).

Referring to FIG. 12d, when $W_{opt,comp1}$ reaches the threshold value of $W_{opt,comp1,max}$, and would pass this value when further up dimming would be possible, then $WR_{comp}$ is increased. In fact, in embodiments $WR_{comp}$ may be zero left from the vertical dashed line and may be ∞right from the vertical dashed line.

Figure 13A:
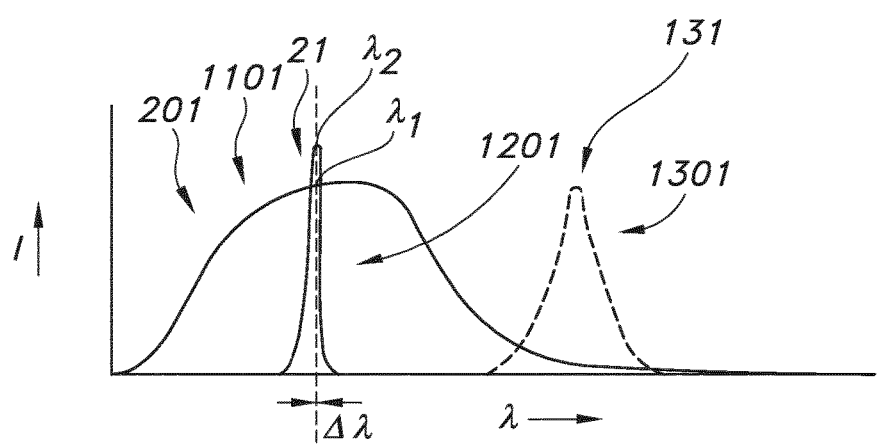
FIGS. 13*a*-13*b* schematically depict some aspects of the invention. The schematic drawings are not necessarily to scale.
Figure 13B:
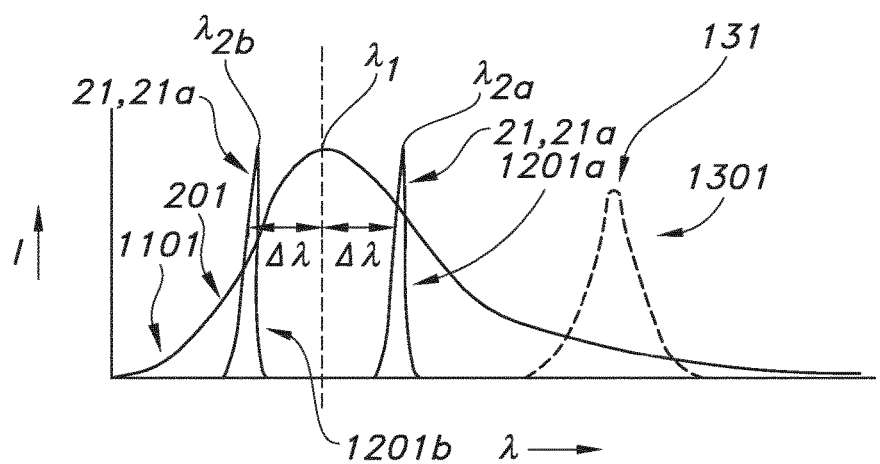

FIGS. 13a-13b schematically depict some aspects of the invention. As schematically depicted the first lighting system light component 1101 has a first spectral power distribution with spectral intensity at a first wavelength $\lambda_1$. Further, the second lighting system light component 1201 has a second spectral power distribution, different from the first spectral power distribution, with spectral intensity at a second wavelength $\lambda_2$, wherein the second wavelength $\lambda_2$ is selected from the range of $\lambda_1-30$ nm$\leq\lambda_2\leq\lambda_1+30$ nm. As schematically depicted, in embodiments the first spectral power distribution may have a band shape. For instance, the first wavelength $\lambda_1$ is a dominant wavelength. Also the second wavelength $\lambda_2$ may in embodiments be a dominant wavelength. In embodiments, $\lambda_2$ may be selected from the range of $\lambda_1-10$ nm$\leq\lambda_2\leq\lambda_1+10$ nm. The first light component 1101 and the second light component 1201 may in embodiments essentially have the same color point.

The dashed emission band refers to a third light source light 131, providing a third lighting system light component 1301, which may also be controlled by the control system.

Instead of a single peak of laser light source light 21, also a plurality of peaks may be provided, see FIG. 13b. References 21a and 21b indicate different laser light source lights, respectively. The relevant second wavelengths are indicated with $\lambda_2 a$ and $\lambda_2 b$, and the relevant second lighting system light component 1201 with references 1201a and 1201b, respectively.

Hence, the invention provides in embodiments a laser phosphor based light source with improved brightness.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting system configured to generate lighting system light, wherein the lighting system light comprises one or more of (i) a first lighting system light component having a first component optical power $W_{opt,comp1}$, and (ii) a second lighting system light component having a second component optical power $W_{opt,comp2}$, wherein the lighting system comprises:

a first light source comprising a first pump light source configured to generate first pump light source light and a luminescent material configured to convert at least part of the first pump light source light into luminescent material light, wherein the first light source in combination with first optics is configured to provide the first lighting system light component, wherein the first lighting system light component comprises at least part of the luminescent material light, wherein the first lighting system light component has a first spectral power distribution with spectral intensity at a first wavelength $\lambda_1$;

a second light source comprising a laser light source configured to generate laser light source light, wherein the second light source in combination with second optics is configured to provide the second lighting system light component, wherein the second lighting system light component comprises at least part of the laser light source light, wherein the second lighting system light component has a second spectral power distribution, different from the first spectral power distribution, with spectral intensity at a second wavelength X2, wherein the second wavelength $\lambda_2$ is selected from the range of $\lambda_1-30$ nm$\leq\lambda_2\leq\lambda_1+30$ nm;

a control system configured to control in at least one control mode the second component optical power $W_{opt,comp2}$ of the second lighting system light component in dependence of the first component optical power $W_{opt,comp1}$ of the first lighting system light component, wherein the control system is further configured to control in a first control mode the second component optical power $W_{opt,comp2}$ of the second lighting system light component in dependence of the first component optical power $W_{opt,comp1}$ of the first lighting system light component only above a predetermined threshold value of the first component optical power $W_{opt,comp1}$ of the first lighting system light component and the control system being configured to keep the color point of the combination of the first lighting system light component and the second lighting system light component within a predefined range of +/−0.05 of a predefined color point.

2. The lighting system according to claim 1, wherein the first pump light source has a maximum first optical power $W_{opt,10,max}$, wherein the laser light source has a maximum second optical power $W_{opt,20,max}$, wherein the second optical power of the laser light source light and the first optical power of the first pump light source light have a ratio $WR_{opt,max}$, wherein $WR_{opt,max}=W_{opt,20,max}/W_{opt,10,max}$, and wherein $0.01\leq W_{opt,20,max}/W_{opt,10,max}\leq 1$.

3. The lighting system according to claim 1, wherein the first spectral power distribution has a band shape, and wherein the first wavelength $\lambda_1$ is a dominant wavelength.

4. The lighting system according to claim 1, wherein the first light source comprises a plurality of first pump light sources and an elongated luminescent concentrator, wherein the plurality of first pump light sources are configured to irradiate with the first pump light source light a radiation input face comprised by a side face of the elongated luminescent concentrator, and wherein the elongated luminescent concentrator is configured to provide the luminescent material light emanating from a radiation exit face comprised by an end face of the elongated luminescent concentrator.

5. The lighting system according to claim 1, wherein the first light source comprises a solid state laser light source, and wherein the second wavelength $\lambda_2$ is selected from the range of $\lambda_1-10$ nm$\leq\lambda_2\leq\lambda_1+10$ nm.

6. The lighting system according to claim 1, wherein the control system is configured to keep the dominant wavelength of the combination of the first lighting system light component and the second lighting system light component within a predefined range of a predefined dominant wavelength +/−10 nm.

7. The lighting system according to claim 1, wherein the first pump light source has a first dimming range over which the first pump light source can be up dimmed and down dimmed, wherein over a first part of the first dimming range there is a linear relation between dimming levels within the first part of the first dimming range and the first component optical power $W_{opt,comp1}$ of the first lighting system light component, wherein over a second part of the first dimming range there is a non-linear relation between dimming levels within the second part of the first dimming range and first component optical power $W_{opt,comp1}$ of the first lighting system light component, and wherein the laser light source comprises a second dimming range over which the laser light source can be up dimmed and down dimmed.

8. The lighting system according to claim 7, wherein the control system is configured to control in a second control mode a ratio $WR_{comp}$ of the second component optical power $W_{opt,comp2}$ of the second lighting system light component and the first component optical power $W_{opt,comp1}$ of the first lighting system light component, $WR_{comp}=W_{opt,comp2}/W_{opt,comp1}$, wherein in the second control mode $WR_{comp}$ is larger in the second part of the first dimming range than in the first part of the first dimming range.

9. The lighting system (1000) according to claim 8, wherein over a first dimming level $W_{10,x}$ of the pump light source the luminescent material light quenches, and wherein the control system is configured to increase $WR_{comp}$ when a dimming level of the first dimming range is equal to or higher than $0.7*W_{10,x}$.

10. The lighting system according to claim 8, wherein the control system is configured to increase in a fourth control mode the second component optical power $W_{opt,comp2}$ with increasing optical power $W_{opt,sys}$ of the lighting system light, wherein over at least part of a dimming range of the optical power $W_{opt,sys}$ of the lighting system light there is a linear or non-linear relation between the second component optical power $W_{opt,comp2}$ with increasing optical power $W_{opt,sys}$ of the lighting system light, wherein over at least part of the dimming range of the optical power $W_{opt,sys}$ of the lighting system light the ratio $WR_{comp}$ increases with up dimming.

11. The lighting system according to claim 7, wherein over a third part of the first dimming range there is a negative relation between dimming levels within the third part of the first dimming range and the first component optical power $W_{opt,comp1}$ of the first lighting system light component, wherein the control system is configured to control in a third control mode the ratio $WR_{comp}$, wherein in the third control mode $WR_{comp}$ is larger in the third part of the first dimming range than in the second part of the first dimming range.

12. The lighting system according to claim 1, wherein both the first pump light source and the second light source light source are configured upstream of the luminescent material, and wherein the luminescent material is transmissive for the laser light source light, wherein an absorption of the laser light source light by the luminescent material is less than 10% of the laser light source light, and wherein the first optics comprise a wavelength dependent optical filter.

13. The lighting system according to claim 1, further comprising an optical sensor configured to receive part of the lighting system light, or of the first pump light source light, and to provide a corresponding sensor signal, wherein the control system is configured to control in the one or more control modes the first component optical power $W_{opt,comp1}$ of the first lighting system light component and the second component optical power $W_{opt,comp2}$ of the second lighting system light component in dependence of the sensor signal.

14. The lighting system according to claim 1, further comprising a third light source configured to generate third light source light, wherein in the one or more controlling modes the lighting system light comprises (a) one or more of the first lighting system light component and the second lighting system light component, and (b) a third lighting system component having a third component optical power $W_{opt,comp3}$, wherein the third lighting system light component comprises the third light source light, wherein the third lighting system light component has a third spectral power distribution, different from the first spectral power distribution and the second spectral power distribution, and wherein the control system is further configured to control in the one or more controlling modes also the third component optical power $W_{opt,comp3}$ of the third lighting system light component.

15. A projection system or a luminaire comprising the lighting system according to claim 1.

* * * * *